(12) United States Patent
McGuire, Jr. et al.

(10) Patent No.: US 8,747,261 B2
(45) Date of Patent: Jun. 10, 2014

(54) REINFORCED OBJECTS

(75) Inventors: James E. McGuire, Jr., Westerville, OH (US); Andrew C. Strange, Worthington, OH (US)

(73) Assignee: entrotech composites, LLc, Columbus, OH (US)

( * ) Notice: Subject to any disclaimer, the term of this patent is extended or adjusted under 35 U.S.C. 154(b) by 179 days.

(21) Appl. No.: 12/624,370

(22) Filed: Nov. 23, 2009

(65) Prior Publication Data

US 2011/0124446 A1   May 26, 2011

(51) Int. Cl.
*A63B 59/02* (2006.01)
*A63B 65/12* (2006.01)

(52) U.S. Cl.
USPC .......................................................... 473/513

(58) Field of Classification Search
USPC .......................... 473/505, 512, 513; D21/724
See application file for complete search history.

(56) References Cited

U.S. PATENT DOCUMENTS

| | | | | |
|---|---|---|---|---|
| 1,042,808 A | * | 10/1912 | Macmanus | 244/125 |
| 1,183,473 A | * | 5/1916 | McNice | 473/560 |
| 1,821,191 A | * | 9/1931 | Robinson | 473/312 |
| 1,858,512 A | * | 5/1932 | Langenberg et al. | 52/834 |
| 2,033,722 A | * | 3/1936 | MacFarland | 473/316 |
| 2,602,766 A | * | 7/1952 | Francis | 87/6 |
| 3,007,497 A | * | 11/1961 | Shobert | 138/125 |
| 3,507,496 A | * | 4/1970 | Miller | 273/339 |
| 3,919,764 A | * | 11/1975 | Berghezan | 228/185 |
| 3,938,964 A | * | 2/1976 | Schmidt | 138/143 |
| 3,945,555 A | * | 3/1976 | Schmidt | 228/126 |
| 3,972,529 A | * | 8/1976 | McNeil | 473/320 |
| 4,045,025 A | * | 8/1977 | Staub et al. | 473/535 |
| 4,355,061 A | * | 10/1982 | Zeigler | 428/36.4 |
| 4,361,325 A | | 11/1982 | Jansen | |
| 4,615,163 A | * | 10/1986 | Curtis et al. | 52/836 |
| 4,671,511 A | * | 6/1987 | Trysinsky | 473/552 |
| 4,968,545 A | * | 11/1990 | Fellman et al. | 428/36.1 |
| 5,135,223 A | * | 8/1992 | You | 473/523 |
| 5,209,136 A | * | 5/1993 | Williams | 74/502.5 |
| 5,261,616 A | * | 11/1993 | Crane et al. | 242/445.1 |
| 5,333,857 A | | 8/1994 | Lallemand | |

(Continued)

FOREIGN PATENT DOCUMENTS

| | | | |
|---|---|---|---|
| WO | WO99/20357 | * | 4/1999 |
| WO | WO 99/20357 | * | 4/1999 |
| WO | WO-2007/048145 | | 4/2007 |
| WO | WO-2008/051629 | | 5/2008 |

OTHER PUBLICATIONS

Webpage download, ResearchRecord, Feb. 2003, www.michigan.gov/documents/mdot_c&t_rr-97_66908_7.pdf, 4 pages.*

*Primary Examiner* — Gene Kim
*Assistant Examiner* — M Chambers
(74) *Attorney, Agent, or Firm* — The Griffith Law Firm, A.P.C.; Lisa M. Griffith

(57) ABSTRACT

A reinforced object of the invention comprises: at least one structural layer; and at least one reinforcing rod positioned on or within the at least one structural layer, wherein the object is an elongated object, with the at least one reinforcing rod longitudinally positioned essentially parallel to a central axis thereof. A method of manufacturing the reinforced object comprises steps of: providing a mold; and positioning the at least one reinforcing rod such that it is positioned on or within the at least one structural layer in the reinforced object formed in the mold.

22 Claims, 27 Drawing Sheets

(56) References Cited

U.S. PATENT DOCUMENTS

| | | | |
|---|---|---|---|
| 5,421,574 A * | 6/1995 | Yamagishi et al. | 473/282 |
| 5,474,721 A * | 12/1995 | Stevens | 264/45.3 |
| 5,600,912 A * | 2/1997 | Smith | 42/76.01 |
| 5,624,516 A * | 4/1997 | Hanusiak et al. | 156/173 |
| 5,718,647 A * | 2/1998 | Tiitola | 473/562 |
| 5,749,798 A * | 5/1998 | Kuebler et al. | 473/549 |
| 5,776,008 A * | 7/1998 | Lundberg | 473/320 |
| 6,004,224 A * | 12/1999 | Tanaka | 473/297 |
| 6,113,508 A | 9/2000 | Locarno et al. | |
| 6,117,029 A * | 9/2000 | Kunisaki et al. | 473/561 |
| 6,197,232 B1 * | 3/2001 | Stevens | 264/45.3 |
| 6,234,912 B1 * | 5/2001 | Koschier et al. | 464/183 |
| 6,500,079 B1 | 12/2002 | Tucker | |
| 6,514,156 B1 * | 2/2003 | Zorzi | 473/319 |
| 6,595,868 B1 * | 7/2003 | Androlia | 473/318 |
| 6,752,730 B1 * | 6/2004 | Brine et al. | 473/513 |
| 6,820,654 B2 * | 11/2004 | Lindsay | 138/153 |
| 6,939,257 B2 | 9/2005 | Tiitola | |
| 6,960,144 B2 | 11/2005 | Tucker | |
| 7,008,338 B2 | 3/2006 | Pearson | |
| 7,108,618 B2 | 9/2006 | Frischmon et al. | |
| 7,108,619 B2 * | 9/2006 | Kavanaugh | 473/560 |
| 7,128,669 B2 * | 10/2006 | Blotteaux | 473/561 |
| 7,231,942 B2 * | 6/2007 | Gesing | 139/91 |
| 7,285,063 B2 * | 10/2007 | Lussier et al. | 473/561 |
| 7,326,135 B2 | 2/2008 | Lussier et al. | |
| 7,416,499 B2 | 8/2008 | Tucker | |
| D589,101 S | 3/2009 | Dickie et al. | |
| 7,862,448 B2 * | 1/2011 | Tanio | 473/319 |
| 2002/0037780 A1 * | 3/2002 | York et al. | 473/560 |
| 2002/0094891 A1 * | 7/2002 | Horwood et al. | 473/560 |
| 2003/0008126 A1 * | 1/2003 | Boesman et al. | 428/300.7 |
| 2003/0008734 A1 * | 1/2003 | Tiitola | 473/560 |
| 2004/0084815 A1 * | 5/2004 | Blotteaux | 264/512 |
| 2004/0116217 A1 * | 6/2004 | Morrow et al. | 473/513 |
| 2005/0043123 A1 * | 2/2005 | Harvey | 473/513 |
| 2005/0130773 A1 * | 6/2005 | Hayden et al. | 473/513 |
| 2006/0009318 A1 * | 1/2006 | Hayden et al. | 473/513 |
| 2006/0100044 A1 * | 5/2006 | Goldsmith et al. | 473/560 |
| 2007/0049431 A1 * | 3/2007 | Meyer et al. | 473/513 |
| 2007/0062630 A1 * | 3/2007 | Wilbur et al. | 156/94 |
| 2007/0072711 A1 * | 3/2007 | Mallas | 473/564 |
| 2007/0197316 A1 * | 8/2007 | DiZazzo et al. | 473/513 |
| 2007/0281808 A1 * | 12/2007 | Hayden et al. | 473/513 |
| 2008/0020871 A1 * | 1/2008 | Morrow et al. | 473/513 |
| 2008/0213490 A1 | 9/2008 | Strange et al. | |
| 2008/0242453 A1 * | 10/2008 | Morrow et al. | 473/513 |
| 2008/0286576 A1 | 11/2008 | McGuire | |
| 2011/0124446 A1 * | 5/2011 | McGuire et al. | 473/513 |

* cited by examiner

REINFORCED OBJECTS

BACKGROUND OF THE INVENTION

The present invention relates generally to reinforced objects, especially reinforced elongated objects such as, for example, shaft-based sporting implements.

Not only due to their geometry, but also due to the often extreme conditions in which they are used, elongated objects have a tendency to fracture, especially transverse to their length. This is often the case when, for example, the elongated object comprises a shaft-based sporting implement. A number of shaft-based sporting implements experience extremely stressful conditions of use. Lacrosse sticks, hockey sticks, golf clubs, tennis and similar rackets, skis, baseball and similar bats, sailboat and similar masts, paddles, and polo mallets are examples of such shaft-based sporting implements.

Not surprisingly, many ways of increasing the strength of shaft-based sporting implements, including those mentioned, have been explored. Sporting implements lacking necessary strength for their purpose can result in competitive disadvantages when, for example, the shaft-based sporting implement breaks during competition. A broken shaft-based sporting implement can also pose a safety hazard to the player using the implement and others. However, when improving the strength of shaft-based sporting implements, competitive disadvantages, such as decreased flexibility and maneuverability, can also be an undesirable consequence.

One way of increasing the strength of shaft-based sporting implements focuses on the type of material used in the implement. For example, a Princeton University student and his father developed the first titanium lacrosse shaft prototypes in 1992. They were found to be twice as strong and half the weight of aluminum or wood. The student and his teammates used the prototypes en route to the lacrosse national championship that year. Warrior Lacrosse, which is now one of the leading manufacturers in the lacrosse industry, was then founded based on that discovery.

U.S. Pat. No. 6,939,257 describes longitudinal reinforcing fibers contained within the outer one of at least two composite layers comprising a hockey shaft. The relative proportion of the reinforcing fibers, whether they be glass or carbon, and the binding material is described as being substantially constant at the different portions of the cross-section of the layer in which they are contained. The longitudinally reinforced fiber layer may be formed by, for example, pultrusion of the fibers. Particularly disclosed is the use of carbon fibers (e.g., those designated in the Figures by numeral 5a) on corners of a rectangular shaft for enhancing impact resistance of the shaft of a hockey stick. Also disclosed is application of an outer layer of reinforcement material (e.g., one containing aramid fibers) to provide protection for the longitudinal reinforcing fibers against blows. The outer layer of reinforcement material can be positioned only at the corners of the rectangular shaft when increased impact resistance is desired.

U.S. Pat. No. 7,008,338 discloses a hockey stick. Further described is a hockey stick blade having a lightweight core and an outer layer formed of a wood laminate, injection-molded plastic, or other material. The outer layer can include inserts such as metal or wood inserts molded, glued or co-formed therewith.

U.S. Patent Publication No. US-2008-0213490 relates to increasing strength of an article by using braid reinforcement. This patent publication discloses resin compositions that facilitate improved impregnation of intermediate pre-braided fiber forms when forming braid-reinforced composites. The braid-reinforced composites can be used in a variety of applications, including wind surfing masts, snow boards, water skis, snow skis, wake boards, sail masts, boat hulls, hockey sticks, golf shafts, bicycle components, baseball bats, tennis and other racquets, and kayak and canoe paddles.

Another way of increasing the strength of shaft-based sporting implements focuses on geometry of the implement. As an example of this approach, U.S. Pat. No. 4,361,325 discloses corner reinforcements on shafts. Disclosed is an elongated, hollow, game stick handle for hockey sticks, or the like, which is formed from a plastic material. The handle has a substantially rectangular cross-section. The outer and inner surfaces of the handle are arcuately shaped for increased strength and improved fracture resistance. The side walls and corners of the handle are of non-uniform thickness, with the minimum wall thickness of the shorter sides being greater than the minimum wall thickness of the larger sides. The maximum wall thickness of the corners is greater than the minimum wall thicknesses of the shorter or larger sides.

U.S. Pat. No. 4,361,325 also discusses how reinforcing ribs have been placed in the interior of a hockey stick shaft to provide desired reinforcement, making the hockey stick more durable. Use of internal rods in shaft-based sporting implements is also discussed in U.S. Pat. No. 6,113,508, which discloses the use of a stiffening rod in cavities of various sporting implements to permit the user to adjust the stiffness thereof. Some embodiments disclose the use of multiple cavities or chambers spaced across the sporting implement (e.g., ski or snow board) to accommodate stiffening rods. As such, each of the pieces of sports equipment discussed therein is capable of being split into multiple sections, each with its own adjustable flexibility and stiffness. The stiffening rods are described as being capable of being stepped or tapered and not necessarily of uniform dimension.

U.S. Pat. No. 7,108,618 discloses methods and apparatus for repairing fractured, hollow-shafted hockey sticks. In one aspect, a shaft extension member for repairing or adjusting the length of hockey shaft is disclosed. Either or both of the shaft and shaft extension member can be made of composite material. The shaft extension member can have internal reinforcement structures of various geometries for increased strength.

U.S. Pat. Nos. 7,285,063 and 7,326,135 disclose hockey stick shafts having a cross-section and other properties varying along a length thereof. The varying cross-section defines selected regions of optimized grip for the hands of a player and of optimized rigidity and resistance in torsion of the shaft. The shaft may comprise reinforcements, such as longitudinally oriented high tensile strength wires and fibers on opposite surfaces, as a way to increase rigidity of the shaft and hold broken pieces of the shaft together in the event of a transverse sectional breakage thereof.

Exterior add-ons have also been used on some shaft-based sporting implements for certain purposes. For example, U.S. Pat. No. 6,500,079 discloses a variable hand placement sports equipment handle, such as a lacrosse stick handle, hockey stick handle, or field hockey stick handle, which includes a shaft and at least one overlay attached to the shaft at a location of frequent hand placement. The overlays are specially located and structured to provide the shaft with structural and tactile features that correspond to and accommodate the way in which a player moves his hands along the shaft and grips the shaft. The structural and tactile features, such as ribs, grooves, and hourglass and conical shapes, are located on the shaft to enhance a player's control of the shaft when performing various skills. In one embodiment, an overlay (that could be smooth or consist of latitudinal ribs) extends the entire length of a shaft to completely encase the shaft and provide an end cap on the shaft. By encasing the entire length of the shaft, the shaft is said to be better protected and able to be constructed of a thinner wall thickness. The overlays are described as being made of a material that is preferably soft, pliable, deformable, and tacky in places, so as to provide a player with a better hold on the handle.

U.S. Pat. No. 7,108,619 discloses a hockey stick handle that has an inner shaft member of carbon fiber or other material, which provides flexing characteristics, and an outer tubular member in which the inner shaft member is fitted. The outer tubular member provides protection for the inner shaft member by facilitating the advantages of a carbon fiber handle, but with a reduced tendency of breakage.

An alternative method for reducing the tendency of composite hockey sticks to break is described in U.S. Pat. No. 7,128,669. Disclosed therein is a composite hockey stick shaft having an elongated body and four side wall members. At least one side wall member comprises an inner layer of fibers disposed within a matrix material, a layer of viscoelastic material anchored onto the outside surface of the inner layer, and an outer layer of fibers disposed within the matrix material. The outer layer is disposed on and abuts the outside of the layer of viscoelastic material.

Each of the above-described methods of increasing the strength of shaft-based sporting implements has its advantages and disadvantages. Nevertheless, further ways of increasing the strength of a variety of objects, including various shaft-based sporting implements, are desired.

BRIEF SUMMARY OF THE INVENTION

A reinforced object of the invention comprises: at least one structural layer; and at least one reinforcing rod positioned on or within the at least one structural layer, wherein the object is an elongated object, with the at least one reinforcing rod longitudinally positioned essentially parallel to a central axis thereof. An exemplary method of manufacturing the reinforced object comprises steps of: providing a mold; and positioning the at least one reinforcing rod such that it is positioned on or within the at least one structural layer in the reinforced object formed in the mold.

The reinforced object can be solid or hollow. In an exemplary embodiment, the reinforced object comprises a shaft-based sporting implement (e.g., a lacrosse stick or a hockey stick).

According to one embodiment of the invention, at least one of the object and the at least one reinforcing rod has a cross-sectional shape, with respect to a section taken transverse to the central axis, selected from the following shapes: circle, ellipse, triangle, square, rectangle, pentagon, hexagon, and octagon. Cross-sectional shape of the at least one reinforcing rod and/or the object can vary along its length. Similarly, thickness of at least one of the object and the at least one reinforcing rod varies along its length.

The reinforced object comprises any suitable material or combinations thereof. In one embodiment, the at least one structural layer comprises a composite material. According to an exemplary aspect of this embodiment, the at least one structural layer comprises a carbon fiber-reinforced composite material. In one embodiment, the at least one reinforcing rod comprises a material not contained within an outermost structural layer of the object. In an exemplary embodiment, the at least one reinforcing rod comprises carbon.

The at least one reinforcing rod is at least partially encapsulated in a further embodiment of the invention. For example, the at least one reinforcing rod is at least partially encapsulated within a layer of elastomeric material in one embodiment. As a further example, the at least one reinforcing rod is at least partially encapsulated within a layer of rigid material in another embodiment.

The reinforced object further comprises a bonding layer comprising a rigid material disposed between the at least one reinforcing rod and the at least one structural layer in one embodiment. The reinforced object further comprises a bonding layer comprising an elastomeric material disposed between the at least one reinforcing rod and the at least one structural layer in another embodiment.

In an exemplary embodiment, the at least one structural layer comprises an outermost structural layer of the object. The reinforced object further comprises at least one outwardly exposed non-structural layer in one embodiment. The reinforced object further comprises at least one outwardly exposed graphics layer according to one aspect of the invention.

In one embodiment, the object comprises at least two reinforcing rods. In a further embodiment, the object comprises at least four reinforcing rods. In yet a further embodiment, the object comprises at least six reinforcing rods. In still a further embodiment, the object comprises at least eight reinforcing rods. Preferably, each of the reinforcing rods within the object is discrete.

In one embodiment, the at least one reinforcing rod is positioned between adjacent structural layers within the object. In another embodiment, the object comprises a hollow object and the at least one reinforcing rod is positioned on a structural layer interior to the hollow object. In a particularly preferred embodiment, at least one reinforcing rod is positioned at a location on the object that is prone to impact. According to one aspect of the invention, at least one reinforcing rod is positioned at a corner of the object.

BRIEF DESCRIPTION OF THE SEVERAL
VIEWS OF THE DRAWINGS

DETAILED DESCRIPTION OF THE INVENTION

Figure 1A:
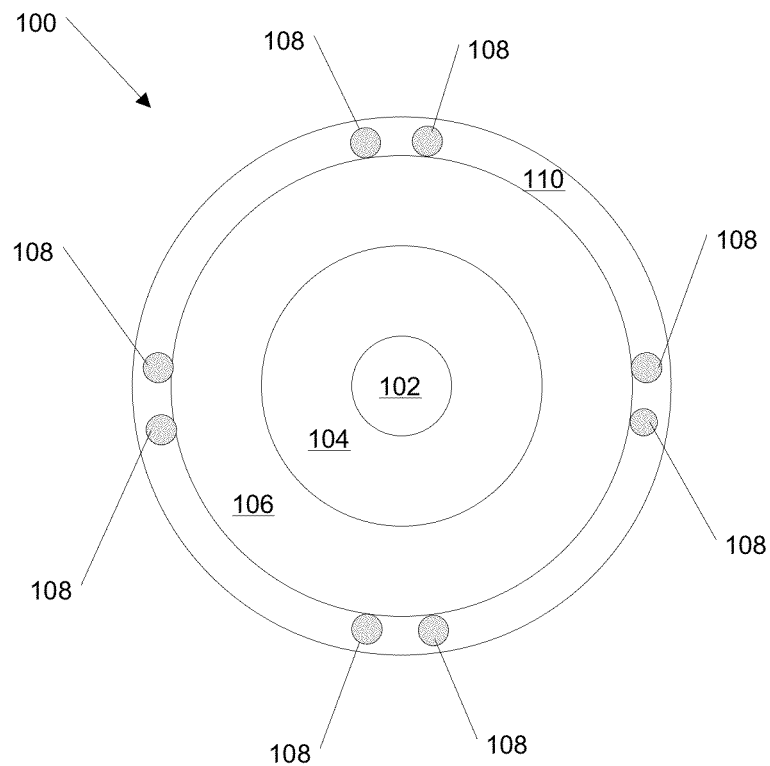
FIG. 1A is a cross-sectional representation of relative positions of reinforcing rods and layers in an exemplary lacrosse stick shaft according to the invention when viewed along a plane transverse to a central axis of the shaft.

Reinforcement according to the invention increases strength, particularly transverse or latitudinal strength, of an elongated object. In certain embodiments, the reinforcement also functions to improve the object's tolerance to damage and/or resistance to impact (i.e., dynamic response). For example, such reinforcement can protect fibers (e.g., carbon fibers, which can easily break) within underlying composite materials from breaking. When fibers within fiber-reinforced composite materials break, catastrophic failure often results. Thus, reinforcement according to the invention is often crucial for preventing such failure.

Reinforcement according to the present invention advantageously benefits a wide variety of objects. For example, improved elongated objects are obtainable when manufactured such that they comprise reinforcement according to the invention. An exemplary elongated object is a shaft—for example, the long slender handle on various instruments and tools such as sporting implements. When reinforced according to the invention, such reinforced shafts provide any of a number of performance advantages, including a reduced tendency to break. Other performance advantages include, for example, those related to increased stiffness of the reinforced shaft and/or a reduction in vibrations therein.

As defined herein, "shaft-based sporting implement" includes any type of stick, bat, racket, club, ski, board, mast, pole, skate, paddle, mallet, or similar structure that is used in sports. These objects generally flex to strike or pick up and carry an object such as a ball or puck (e.g., as in the case of hockey, lacrosse, batting, golf, tennis, etc.) or to carry a person (e.g., as in the case of pole vaulting), flex in response to engaging a frictional surface (e.g., as in the case of skis against the ground, snow, or water), or flex in response to environmental forces (e.g., as in the case of the wind against a sail). For the sake of brevity, a hockey stick or a lacrosse stick is also referred to simply as a stick; a baseball bat, softball bat, or cricket bat is also referred to simply as a bat; a tennis racket, paddleball racket, squash racket, court tennis racket, or badminton racket is also referred to simply as a racket; a golf club is also referred to simply as a club; a water ski, a downhill ski, or a cross-country ski is also referred to simply as a ski; a snow board or ski board is also referred to simply as a board; a snow skate is also referred to simply as a skate; a pole vault pole or a ski pole is also referred to simply as a pole; an oar or paddle are also referred to simply as a paddle; and, a polo mallet is also referred to simply as a mallet. This list is not intended to be exhaustive.

Geometry of the object can vary, with the object being hollow (e.g., tubular) or solid throughout. The object can have any of a number of cross-sectional shapes with respect to a section taken transverse to a central axis of the object (i.e., with respect to the length of the object). For example, the object can have any of the following cross-sectional shapes: circle, ellipse, triangle, square, rectangle, pentagon, hexagon, octagon, and the like. The cross-sectional shape of the object can vary along its length. Similarly, thickness of the object or one or more walls within the object can vary along its length.

The object can comprise any suitable material, including combinations thereof. Exemplary materials for the object include, but are not limited to, wood, plastic, metal (e.g., titanium or aluminum), and composites. A number of, for instance, composite materials can be used in objects of the present invention. For example, composites comprising fiber reinforcement can be used for the object. Typical reinforcing fibers for such composites include, for example, those made of one or more metals (e.g., carbon), ceramics (e.g., fiberglass), natural fibers, synthetic fibers (e.g., aramid), and the like. In an exemplary embodiment, a composite reinforced with carbon fibers, which are particularly prone to breaking upon impact, is used for the object.

Reinforcement of objects according to the invention comprises positioning of at least one reinforcing rod on (preferably exterior to) or within at least one structural layer of the object. As used herein, the term "structural layer" refers to a layer required for use of the object for its intended purpose, as opposed to those layers imparting primarily aesthetic or other non-essential properties to the object. At least one reinforcing rod is longitudinally positioned essentially parallel to a central axis of the object.

In contrast to general placement of conventional reinforcing ribs or stiffening rods along a central axis within the hollow cavity internal to structural layer(s) of certain shaft-based sporting implements, reinforcing rods according to the present invention are positioned at least on or within a structural layer of the object, preferably at a location prone to impact (i.e., at a location radially extending from an outer surface of the object prone to impact to the center of the object). In an exemplary embodiment, at least one reinforcing rod is positioned at least on or within a structural layer at a corner of the object.

In one embodiment, reinforcement of objects according to the invention comprises positioning of at least one reinforcing rod on or within at least the outermost structural layer of the object. While further outer layers may partially or fully encapsulate the outermost structural layer according to this embodiment, those further outer layers generally comprise non-structural layers (i.e., layers not required for use of the object for its intended purpose, but rather those layers imparting primarily aesthetic or other non-essential properties to the object). Exemplary non-structural layers include those comprising graphics and/or protective layers, such as those protective sheets described in PCT International Patent Publication Nos. WO2007/048145 and WO2008/051629. It is to be understood that certain layers function both as graphics layers and protective layers. In one embodiment, reinforced objects of the invention comprise a non-structural layer adjacent the outermost structural layer, wherein the non-structural layer functions as both a graphics layer and a protective layer. In another embodiment, reinforced objects of the invention comprise two non-structural layers adjacent the outermost structural layer, wherein the two non-structural layers comprise a graphics layer and a protective layer positioned adjacent the outermost structural layer in either order.

In another embodiment, at least one reinforcing rod is positioned between adjacent structural layers within the object. According to this embodiment, such reinforcing rod(s) also provide structural support for the object. Such a reinforced object can be made by, for example, positioning the reinforcing rod(s) to provide structural support between structural layers in a prepreg lay-up, which is then molded into the reinforced object.

When the reinforcing rod is positioned on, as opposed to within, a structural layer, a bonding layer may be disposed between the reinforcing rod and the structural layer in further embodiments. In such embodiments, the bonding layer comprises any suitable material and any suitable thickness to effectuate desired properties. For example, a bonding layer of rigid material can be used to enhance stiffness of the object. Exemplary rigid materials include epoxies, which may be toughened or flexibilized in further embodiments. As a further example, a bonding layer of elastomeric material can be used to increase the object's resistance to impact by providing intrinsic damping. Exemplary elastomeric materials include those comprising polyesters, acrylics, silicones, polyamides, and urethanes. Although thickness of the bonding layer can vary, overall and around the circumference of the structural layer, in exemplary embodiments, the bonding layer has a thickness of about 25 microns to about 250 microns, preferably about 150 microns. The bonding layer can be formed using any suitable methodology. Exemplary methods for application of the bonding layer include coating, wrapping (e.g., as in the case of a bonding layer comprising a film), and molding technologies.

Preferably, each of the reinforcing rods within an object of the invention is discrete. That is, when multiple reinforcing rods are used, preferably each of the reinforcing rods is not directly coupled with any of the other reinforcing rods. Durability of each reinforcing rod, thus, does not impact overall reinforcement of the object to the extent otherwise seen upon failure of or damage to part of a contiguous structure.

Reinforcing rods are preferably positioned at one or more locations prone to impact. For example, corners on an elongated object are often more prone to impact than sides of an elongated object. In one embodiment, a shaft-based object of the invention comprises a triangular cross-section, with at least one reinforcing rod positioned at one or more of, most preferably each of, the triangle's three corners. In another embodiment, a shaft-based object of the invention comprises a rectangular cross-section, with at least one reinforcing rod positioned at one or more of, most preferably each of, the rectangle's four corners. In yet another embodiment, a shaft-based object of the invention comprises a pentangular cross-section, with at least one reinforcing rod positioned at one or more of, most preferably each of, the pentagon's five corners. Similarly, in another embodiment, a shaft-based object of the invention comprises a hexangular cross-section, with at least one reinforcing rod positioned at one or more of, most preferably each of, the hexagon's six corners. In yet another embodiment, a shaft-based object of the invention comprises an octangular cross-section, with at least one reinforcing rod positioned at one or more of, most preferably each of, the octagon's eight corners.

Dimensions of each reinforcing rod within a reinforced object of the invention can vary. In one embodiment, each of the reinforcing rods within the object comprising multiple reinforcing rods according to the invention has essentially the same dimensions. In another embodiment, one or more of the dimensions of each of the reinforcing rods within the object comprising multiple reinforcing rods varies among reinforcing rods.

Each reinforcing rod can have any of a number of cross-sectional shapes with respect to a section taken transverse to the length of the reinforcing rod. For example, the reinforcing rod can have any of the following cross-sectional shapes: circle, ellipse, triangle, square, rectangle, pentagon, hexagon, octagon, and the like. The cross-sectional shape of the reinforcing rod can vary along its length. Similarly, thickness of the reinforcing rod can vary along its length.

Further, the length of each reinforcing rod can vary. For example, in one embodiment, the length of each reinforcing rod within the object approximates the length of the object. In alternative embodiments, the length of each reinforcing rod varies within the object. Preferably, at least one reinforcing rod within the object has a length approximating the length of the object.

In contrast to fibers, reinforcing rods of the invention have a substantial thickness such that they are rigid (i.e., they can maintain their elongated shape in the absence of any exterior support, such as an encapsulating matrix resin that may or may not be part of a prepreg fabric architecture). While the thickness of each reinforcing rod can vary within an object comprising multiple reinforcing rods, in one embodiment each reinforcing rod within the object has a thickness of about 0.5 millimeters (0.02 inch) to about 8.0 millimeters (0.3 inch). In a further embodiment, each reinforcing rod within the object has a thickness of about 1.0 millimeters (0.04 inch) to about 6.0 millimeters (0.2 inch). In yet a further embodiment, each reinforcing rod within the object has a thickness of about 2.0 millimeters (0.08 inch) to about 4.0 millimeters (0.2 inch). In an exemplary embodiment, each reinforcing rod within the object has a maximum thickness of about 3.175 millimeters (about 0.125 inch). While the ratio of reinforcing rod diameter to thickness of walls within the object can vary, it is preferred that the reinforcing rod has a diameter that is about 0.5 to about 2.0 times the maximum wall thickness within the object. It is to be understood that the thickness of each reinforcing rod can also vary along its length.

According to one aspect of the invention, at least one reinforcing rod renders the object stronger and less susceptible to breakage than the same object without the reinforcing rod. In one embodiment, the reinforcing rod comprises a material not contained within the outermost structural layer of the object. In an alternative embodiment, the reinforcing rod comprises a material contained within the outermost structural layer of the object.

Each reinforcing rod comprises any suitable material imparting one or more improved performance properties to the object when used in the reinforcing rod. Exemplary reinforcing rod materials comprise, for example, those made of one or more metals or metalloids (e.g., those comprising at least one of carbon, aluminum, steel, titanium, magnesium, and boron), ceramics (e.g., fiberglass), synthetic materials (e.g., light, strong para-aramid synthetic fiber material available from DuPont under the KEVLAR trade designation and ultra-high molecular weight polyethylene available from Honeywell Specialty Materials of Morristown, N.J. under the SPECTRA trade designation or from Royal DSM of the Netherlands under the Dyneema trade designation). An exemplary reinforcing rod comprises a pultruded carbon fiber rod, such as those microfiber carbon rods available from Avia Sport Composites, Inc. (Hickory, N.C.) under the trade designation MCR and having a diameter of 0.080 inch (2.0 mm).

In a further embodiment, at least one reinforcing rod positioned on or within a structural layer of the object is at least partially encapsulated within a layer of material (i.e., an encapsulating material). The encapsulating material can be applied using any suitable methodology. Exemplary methods for application of the encapsulating material to the reinforcing rod include coating, wrapping (e.g., wrapping a film of the encapsulating material to at least partially encapsulate the reinforcing rod), and molding (e.g., reaction injection molding to at least partially encapsulate the reinforcing rod with an overmold of the encapsulating material) technologies.

According to one aspect of this embodiment, the at least one reinforcing rod is at least partially encapsulated within an encapsulating layer of rigid material to enhance stiffness of the object. Any suitable rigid material having any suitable thickness can be used in this embodiment. Exemplary rigid materials include epoxies, which may be toughened or flexibilized in further embodiments. Although thickness of the encapsulating layer of rigid material can vary, overall and around the circumference of the reinforcing rod, in exemplary embodiments, the rigid material at least partially encapsulating the reinforcing rod has a thickness of about 25 microns to about 250 microns, preferably about 150 microns.

According to another aspect of this embodiment, the at least one reinforcing rod is at least partially encapsulated within a layer of elastomeric material to increase the object's resistance to impact by providing intrinsic damping. Any suitable elastomeric material having any suitable thickness can be used in this embodiment. Exemplary elastomeric materials include those comprising polyesters, acrylics, silicones, polyamides, and urethanes. A preferred elastomeric material is urethane rubber. Although thickness of the encapsulating layer of elastomeric material can vary, overall and around the circumference of the reinforcing rod, in exemplary embodiments, the elastomeric material at least partially encapsulating the reinforcing rod has a thickness of about 25 microns to about 250 microns, preferably about 150 microns.

In addition to improvements in strength of an elongated object, which can be provided by reinforcement according to the invention, other performance properties may also be enhanced by reinforcement of objects according to the invention. For example, the moment of inertia of a shaft-based object can be tailored using reinforcing rods of the invention so as to provide desired flexibility within the shaft as it relates to positioning of a user's grip on the shaft. By providing shafts with reinforcing rods of varying dimensions, performance properties thereof can easily be adjusted without requiring a change in, for example, constituents in prepreg used to manufacture a shaft from composite material. As such, manufacture of reinforced objects according to the invention is relatively simple compared to many prior methods of adjusting strength and other performance features of shaft-based objects.

Any suitable method can be used to manufacture reinforced objects according to the invention. Generally, reinforcing rods are longitudinally positioned within reinforced objects of the invention, so any method used to manufacture such reinforced objects should facilitate such positioning on or within at least the one structural layer of the resulting object.

In order to position and secure reinforcing rods on or within a structural layer, any suitable method may be utilized. For example, reinforcing rods can be secured on or within the structural layer using molding, bonding (e.g., using an adhesive, such as glue), co-extrusion, and similar techniques.

In an exemplary embodiment, a reinforced object of the invention is formed using a molding process. Any suitable molding technique can be used. Exemplary molding techniques include: compression, bladder, vacuum bag, autoclave, resin transfer molding RTM, vacuum-assisted RTM, and other similar methods known to those of ordinary skill in the art.

With RTM, vacuum-assisted RTM, and similar methods, reinforcing rods are placed within a mold containing reinforcement material for the composite article to be formed. Matrix material is then injected into the mold to form a reinforced composite article of the invention. Those of ordinary skill in the art are readily familiar with injectable matrix materials and techniques for their use in injection molding. The matrix material itself is generally heated to, for example, a semi-molten state for injection molding. The term "semi-molten" refers to a material that is capable of flowing into the molding area.

Prior to and during injection of the matrix material, the reinforcing rods can be stabilized within the mold using any suitable method and apparatus. Such methods include those using gravity, air pressure, pins, tape, vacuum, and/or other suitable means. In addition, release agents and other molding components can be used as readily understood by those skilled in the art.

According to one aspect of this embodiment, any suitable injection molding apparatus is used for RTM molding. Typically, such molding apparatus have one or more orifices for injection of matrix material into the mold. According to RTM and similar methods, with the mold closed, uncured matrix material (e.g., thermoset resin) is injected into the mold, after which it flows into interstices within the reinforcement material under heat and pressure while curing. Pressure from injecting matrix material into the mold combined with the temperature within the mold and the surface of associated mold parts causes the matrix material to fuse together with or bond to the reinforcing rods.

Other methods of manufacturing reinforced objects, specifically those comprising composite structural layer(s), comprise the use of prepreg. "Prepreg" refers to pre-impregnated composite reinforcement material, where the prepreg contains an amount of matrix material used to bond a reinforcement material together and to other components during manufacture.

Unlike RTM methods, compression, bladder, vacuum bag, autoclave, and similar methods typically involve the use of a prepreg containing both a reinforcement material and a matrix material during molding. With compression, bladder, vacuum bag, autoclave, and similar methods involving the use of prepreg, reinforcing rods are first positioned within a suitable mold. One or more layers of prepreg are then positioned within the mold prior to initiating cure of the prepreg's matrix material. During such curing, which is often effected using heat and pressure, the reinforcing rods become bonded to at least a portion of the outermost surface of the resulting composite article.

In an exemplary process of the invention, vacuum bag processing techniques are used to obtain reinforced objects through in-mold processing. During vacuum bag processing, a prepreg assembly with reinforcing rods positioned therein, as desired, is compacted against a mold surface while a vacuum is pulled across the entire assembly and mold to remove excess air, matrix material, and/or other volatiles from the assembly. While the vacuum is being pulled, the mold is heated to cure the matrix material of the prepreg. According to a preferred embodiment, the vacuum itself provides all the pressure necessary to effect full cure of the matrix material.

Exemplary embodiments and applications of the invention are described in the following non-limiting examples.

EXAMPLE 1A

With reference to FIG. 1A, a lacrosse stick shaft 100 was manufactured to have a length of 150 centimeters (60 inches) and weight of about 444 grams. To form a prepreg layup for the shaft 100, three contiguous layers of carbon fiber braid 102, 104, 106, each having a weight of about 55 grams, an outside diameter of about 2.5 centimeters (1 inch), and a length of about 150 centimeters (60 inches), were obtained from A&P Technology (Cincinnati, Ohio) and positioned within one another by expanding and/or contracting the three carbon fiber braids 102, 104, 106 from their default outside diameter of about 2.5 centimeters (1 inch), which default dimension was measured with the fiber angle of the braid positioned at about 45 degrees to the braid's longitudinal direction. In this embodiment, outside diameter of the inner two carbon fiber braids 102, 104 was progressively reduced so that three contiguous layers of carbon fiber braid 102, 104, 106 were formed. Upon impregnation with resin (i.e., an epoxy resin system containing an amine curing agent), the carbon fiber braid layers 102, 104, 106 comprising the prepreg layup had a total weight of about 275 grams.

Eight longitudinal reinforcing rods 108 were positioned on a protective sheet (i.e., a protective sheet described in U.S. Patent Publication No. US-2008-0286576, which functioned as a protective layer 110 in the reinforced object) such that, after vacuum bag molding, the reinforcing rods 108 were surrounded by the protective layer 110 on the outermost structural layer 106 of the prepreg layup for the lacrosse stick shaft 100 and around the impregnated carbon fiber braid layers 102, 104, 106. Each reinforcing rod 108 had a weight of about 7.8 grams, a diameter of about 2 millimeters (0.08 inch), and a length of about 150 centimeters (60 inches).

The vacuum bag molding process included positioning the prepreg layup interior to the reinforcing rods 108 and protective layer 110 within a mold. The mold was then placed between layers of impermeable film and air was evacuated from between the layers of impermeable film. The mold assembly was then heated at a rate of about 3° C./minute to about 120° C. and held for one hour under pressure of at least about 70 kPa (10 psi). After cooling the mold assembly, the cured lacrosse stick shaft 100 was removed.

EXAMPLE 1B

Figure 1B:
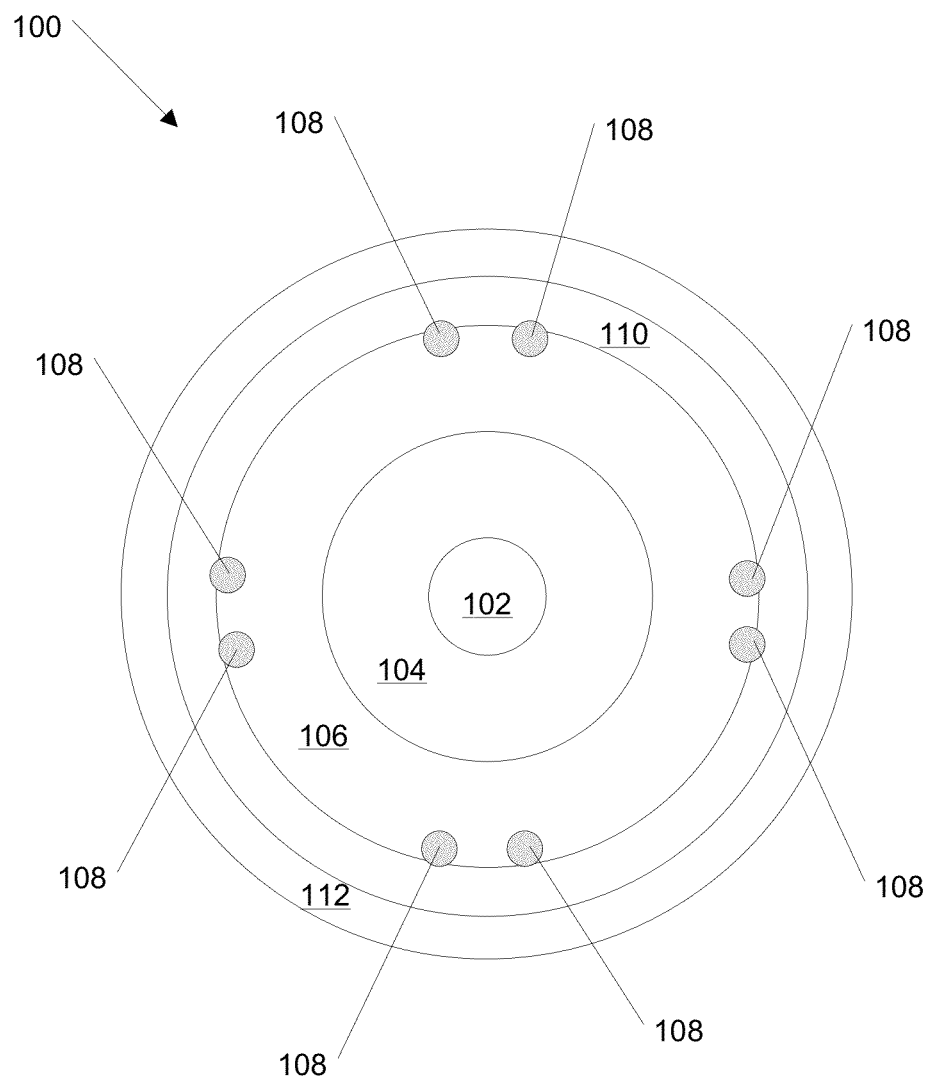
FIG. 1B is a cross-sectional representation of relative positions of reinforcing rods and layers in a further embodiment of the exemplary lacrosse stick shaft of FIG. 1A when viewed along a plane transverse to a central axis of the shaft, further illustrating relative positioning of a protective layer and graphic layer applied to an outermost structural layer of the lacrosse stick shaft.

With reference to FIG. 1B, a lacrosse stick shaft 100 is manufactured as described in Example 1A, except a protective layer 112 is affixed to the exterior of the shaft 200 after vacuum bag molding. The weight of the graphic layer 112 is 65 grams. The graphic layer 112 can comprise any suitable material and configuration and is affixed to the exterior of the lacrosse stick shaft 100 using any suitable methodology.

EXAMPLE 2A

Figure 2A:
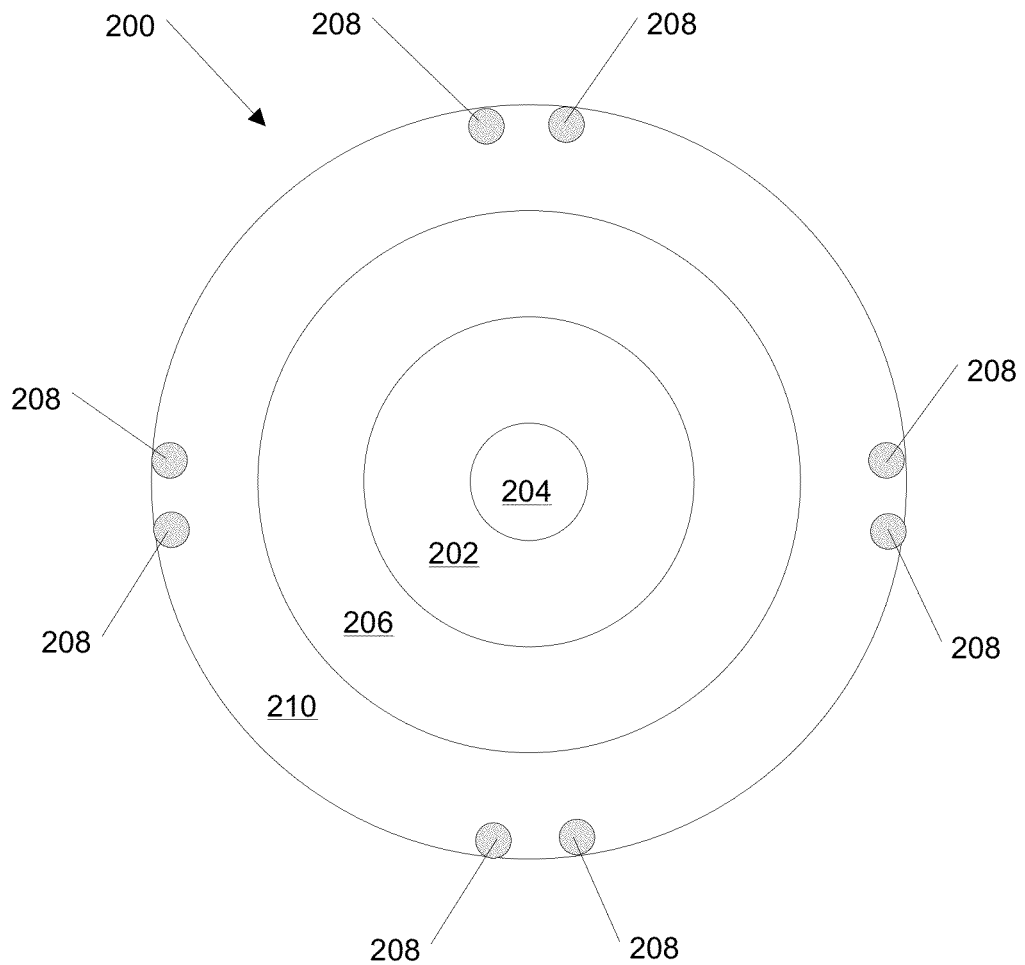
FIG. 2A is a cross-sectional representation of relative positions of reinforcing rods and layers in another exemplary embodiment of a lacrosse stick shaft according to the invention when viewed along a plane transverse to a central axis of the shaft.

With reference to FIG. 2A, a lacrosse stick shaft 200 was manufactured to have a length of about 150 centimeters (60 inches) and weight of about 433 grams. To form a prepreg layup for the shaft 200, a uni-directional carbon fiber layer 202 was formed between two contiguous layers of carbon fiber braid 204, 206, each carbon fiber braid 204, 206 having a weight of about 55 grams, an outside diameter of about 1.5 centimeters (1 inch), and a length of about 150 centimeters (60 inches). The uni-directional carbon fiber layer 202 was that available from Newport Adhesives and Composites, Inc. (Irvine, Calif.) under the trade designation, Newport 304, and the carbon fiber braids 204, 206 were those available from A&P Technology (Cincinnati, Ohio). Upon impregnation with resin (i.e., an epoxy resin system containing an amine curing agent), the carbon fiber braid layers 204, 206 of the prepreg layup had a total weight of about 183.5 grams and the uni-directional carbon fiber layer 202 of the prepreg layup had an impregnated weight of about 81 grams.

Eight longitudinal reinforcing rods 208 were positioned in a mold outside another carbon fiber layer 210, which carbon fiber layer 210 was positioned adjacent the outer impregnated carbon fiber braid layer 206 of the prepreg layup. The carbon fiber layer 210 was that available from Newport Adhesives and Composites, Inc. (Irvine, Calif.) under the trade designation, Newport 304. Each reinforcing rod 208, which reinforcing rods were microfiber carbon rods obtained from Avia Sport Composites, Inc. (Hickory, N.C.) under the trade designation MCR, had a weight of about 7.8 grams, a diameter of about 2 millimeters (0.08 inch), and a length of about 150 centimeters (60 inches).

The mold, so assembled, was then placed between layers of impermeable film and air was evacuated from between the layers of impermeable film. The mold assembly was then heated at a rate of about 3° C./minute to about 120° C. and held for one hour under pressure of at least about 70 kPa (10 psi). After cooling the mold assembly, the cured lacrosse stick shaft 200 was removed.

EXAMPLE 2B

Figure 2B:
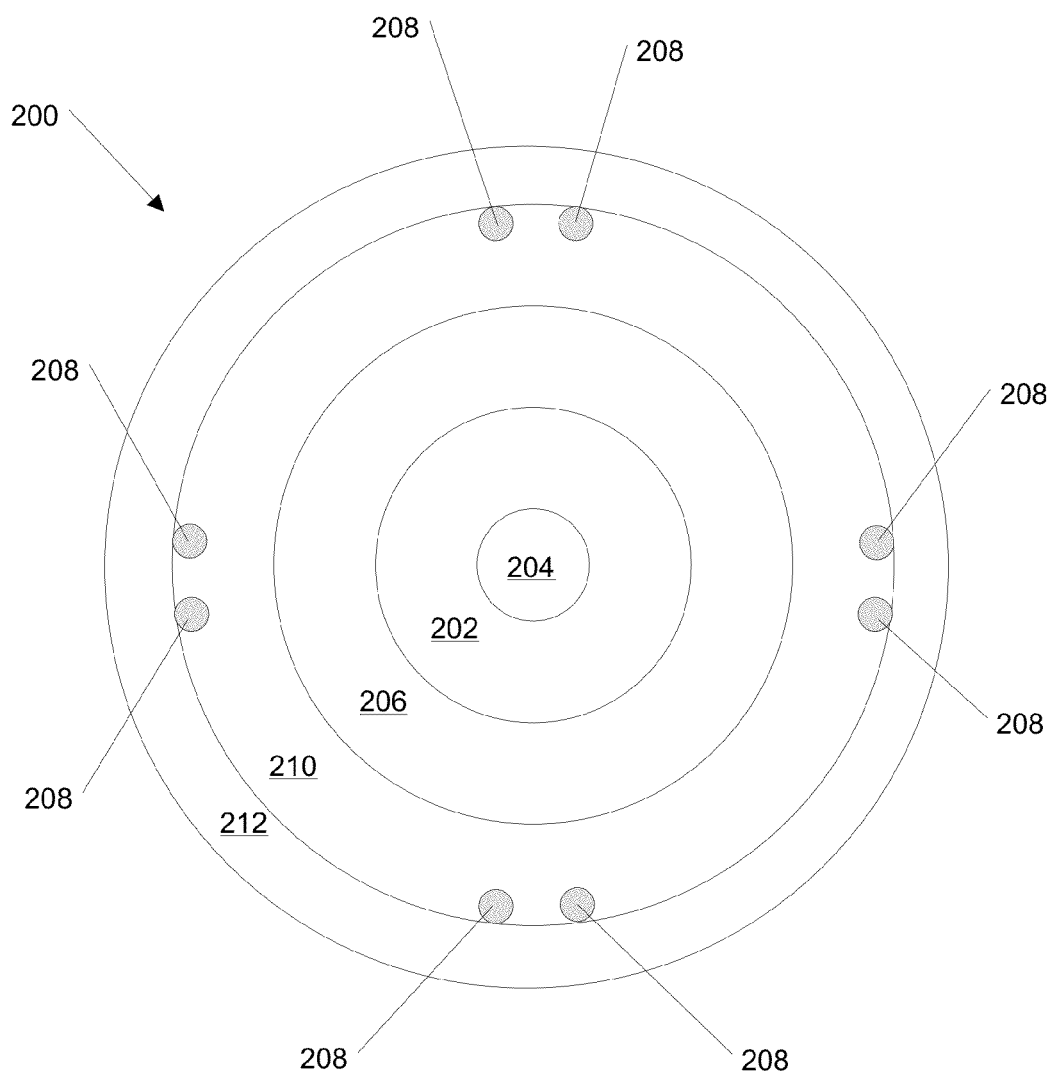
FIG. 2B is a cross-sectional representation of relative positions of reinforcing rods and layers in a further embodiment of the lacrosse stick shaft of FIG. 2A when viewed along a plane transverse to a central axis of the shaft, further illustrating relative positioning of a graphic layer applied to an outermost structural layer of the lacrosse stick shaft.

With reference to FIG. 2B, a lacrosse stick shaft 200 is manufactured as described in Example 2A. To the exterior of the lacrosse stick shaft 200 so formed is affixed a graphic layer 212. The weight of the graphic layer 212 is about 65 grams. The graphic layer 212 can be any suitable material and configuration and is affixed to the exterior of the lacrosse stick shaft 200 using any suitable methodology.

EXAMPLE 3A

Figure 3A:
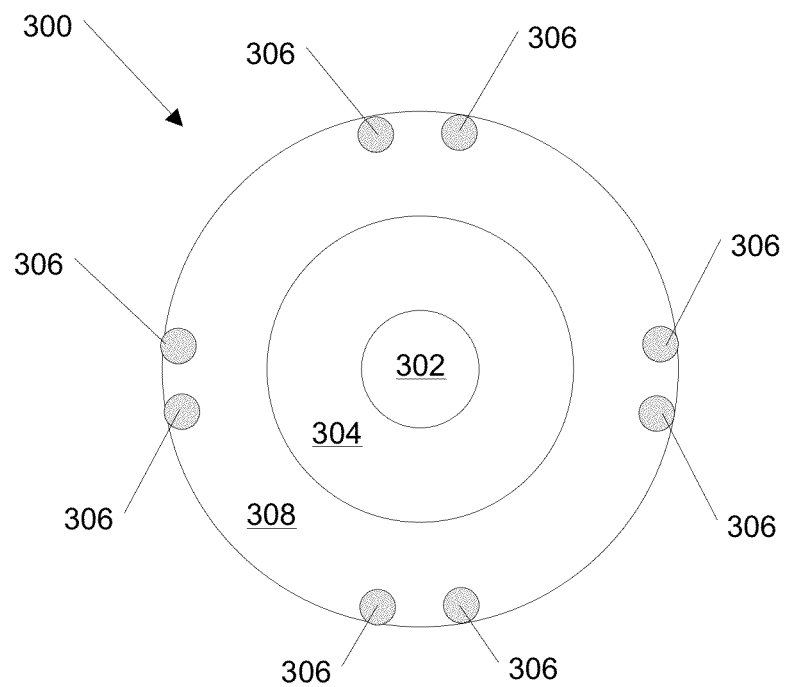
FIG. 3A is a cross-sectional representation of relative positions of reinforcing rods and layers in a further embodiment of a lacrosse stick shaft according to the invention when viewed along a plane transverse to a central axis of the shaft.

With reference to FIG. 3A, a lacrosse stick shaft 300 was manufactured to have a length of about 76 centimeters (30 inches) and a weight of about 176.1 grams. To form a prepreg layup for the shaft 300, two contiguous layers of carbon fiber braid 302, 304, each having a weight of about 27.5 grams, an outside diameter of about 2.5 centimeters (1 inch), and a length of about 76 centimeters (30 inches), were positioned within one another by expanding and/or contracting the two carbon fiber braids 302, 304 from their default outside diameter of about 2.5 centimeters (1 inch), which default dimension was measured with the fiber angle of the braid positioned at about 45 degrees to the braid's longitudinal direction. In this embodiment, outside diameter of the inner carbon fiber braid 302 was reduced so that two contiguous layers of carbon fiber braid 302, 304 were formed. The carbon fiber braids 302, 304 were those available from A&P Technology (Cincinnati, Ohio). Upon impregnation with resin (i.e., an epoxy resin system containing an amine curing agent), the carbon fiber braid layers 302, 304 had a total weight of about 91.6 grams.

Eight longitudinal reinforcing rods 306 were positioned in a mold outside carbon fiber layer 308, which carbon fiber layer 308 was positioned around the impregnated carbon fiber braid layers 302, 304 to form the prepreg layup. Each reinforcing rod 306, which rods were microfiber carbon rods obtained from Avia Sport Composites, Inc. (Hickory, N.C.) under the trade designation MCR, had a weight of about 3.9 grams, a diameter of about 2 millimeters (0.08 inch), and a length of about 76 centimeters (30 inches).

The mold, so assembled, was then placed between layers of impermeable film and air was evacuated from between the layers of impermeable film. The mold assembly was then heated at a rate of about 3° C./minute to about 120° C. and held for one hour under pressure of at least about 70 kPa (10 psi). After cooling the mold assembly, the cured lacrosse stick shaft 300 was removed.

EXAMPLE 3B

Figure 3B:
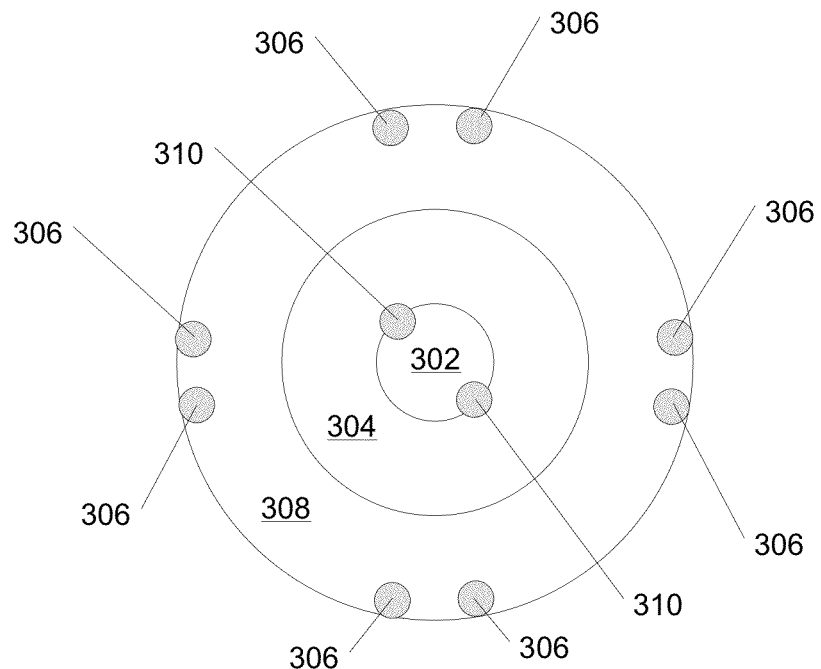
FIG. 3B is a cross-sectional representation of relative positions of reinforcing rods and layers in a further embodiment of the lacrosse stick shaft of FIG. 3A when viewed along a plane transverse to a central axis of the shaft.

With reference to FIG. 3B, a lacrosse stick shaft 300 is manufactured as described in Example 3A, except two additional reinforcing rods 310 are positioned between carbon fiber braid layers 302, 304 to provide additional structural support for the shaft 300.

EXAMPLE 3C

Figure 3C:
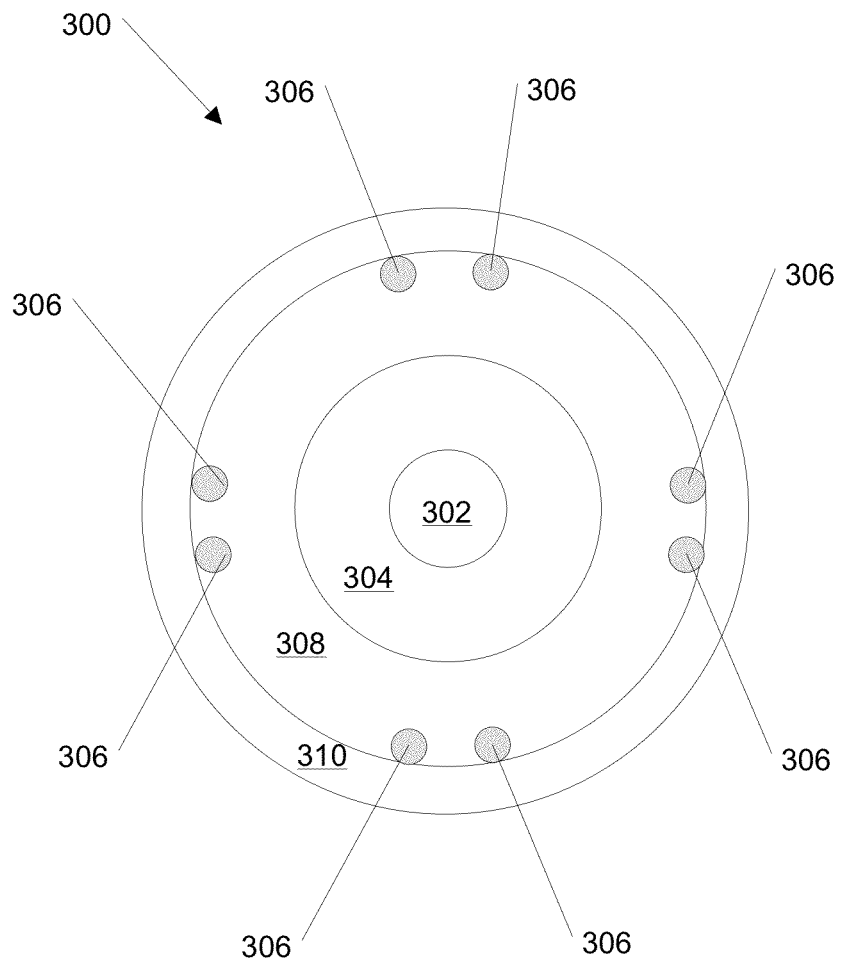
FIG. 3C is a cross-sectional representation of relative positions of reinforcing rods and layers in a further embodiment of the lacrosse stick shaft of FIG. 3A when viewed along a plane transverse to a central axis of the shaft.

With reference to FIG. 3C, a lacrosse stick shaft 300 is manufactured as described in Example 3A, except a graphic layer 310 is affixed to the exterior of the shaft 300 after vacuum bag molding. The weight of the graphic layer 310 is about 32.5 grams. The graphic layer 310 can be any suitable material and configuration and is affixed to the exterior of the lacrosse stick shaft 300 using any suitable methodology.

EXAMPLE 4A

Figure 4A:
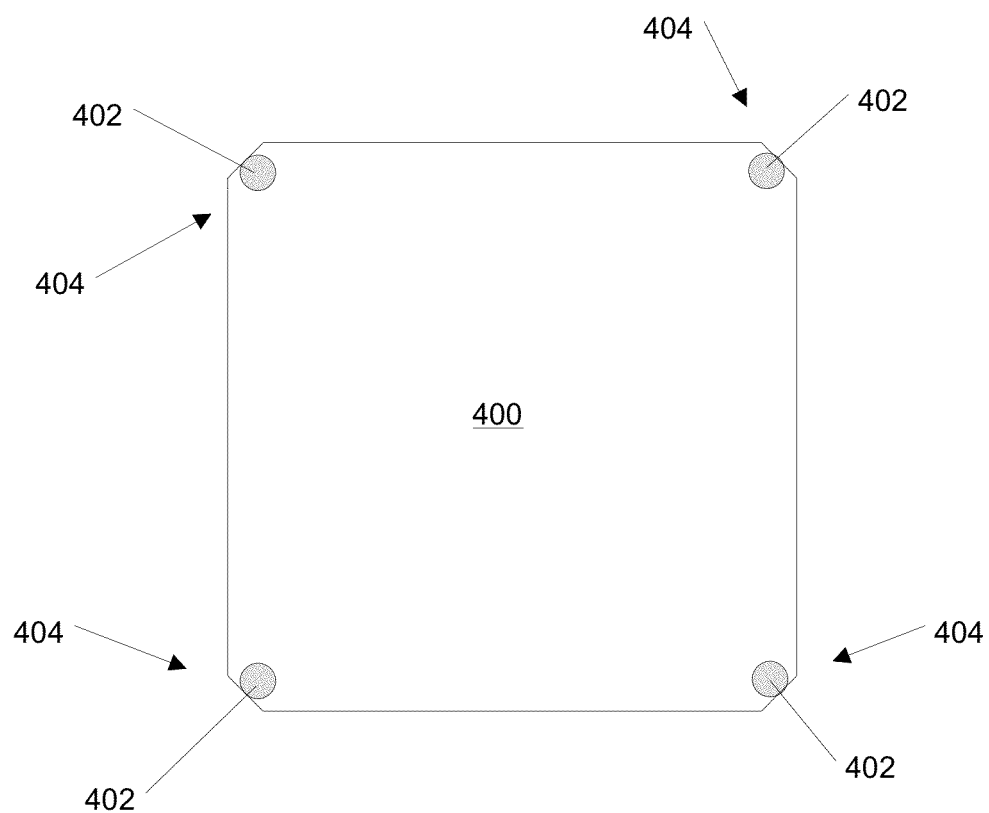
FIG. 4A is a cross-sectional representation of an exemplary embodiment of a reinforced object of the invention when viewed along a plane transverse to a central axis of the object, wherein the object has a square cross-sectional shape.

As illustrated in FIG. 4A, an elongated object with a square cross-sectional shape 400 is reinforced with one reinforcing rod 402 at each of its four corners 404.

EXAMPLE 4B

Figure 4B:
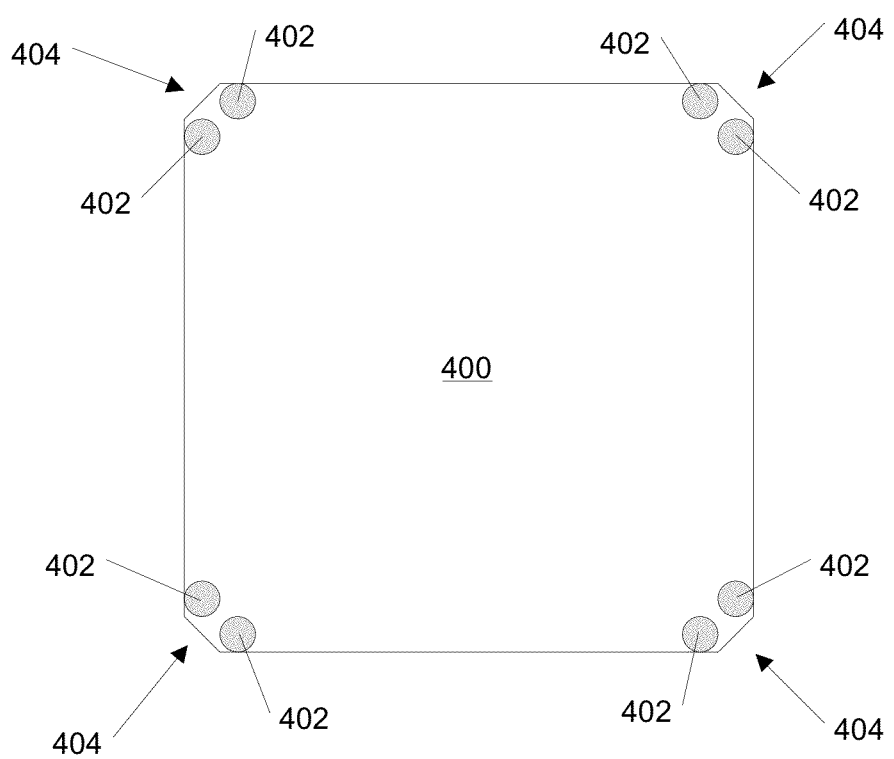
FIG. 4B is a cross-sectional representation of another exemplary embodiment of a reinforced object of the invention when viewed along a plane transverse to a central axis of the object, wherein the object has a square cross-sectional shape.

As illustrated in FIG. 4B, an elongated object with a square cross-sectional shape 400 is reinforced with two reinforcing rods 402 at each of its four corners 404.

EXAMPLE 5A

Figure 5A:
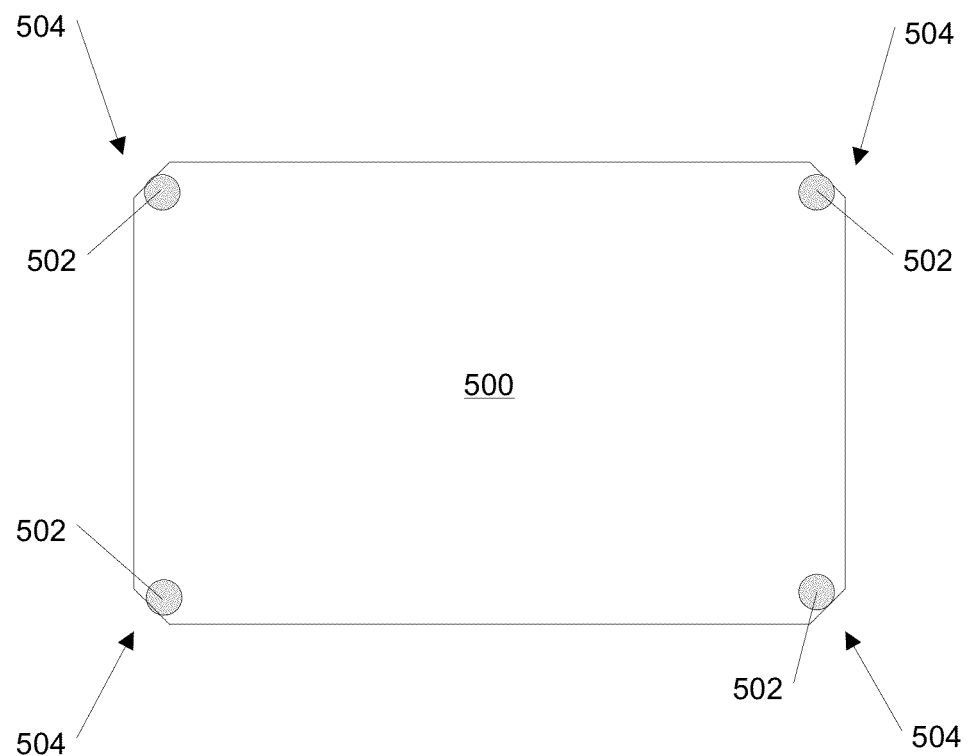
FIG. 5A is a cross-sectional representation of an exemplary embodiment of a reinforced object of the invention when viewed along a plane transverse to a central axis of the object, wherein the object has a rectangular cross-sectional shape.

As illustrated in FIG. 5A, an elongated object with a rectangular cross-sectional shape 500 is reinforced with one reinforcing rod 502 at each of its four corners 504.

EXAMPLE 5B

Figure 5B:
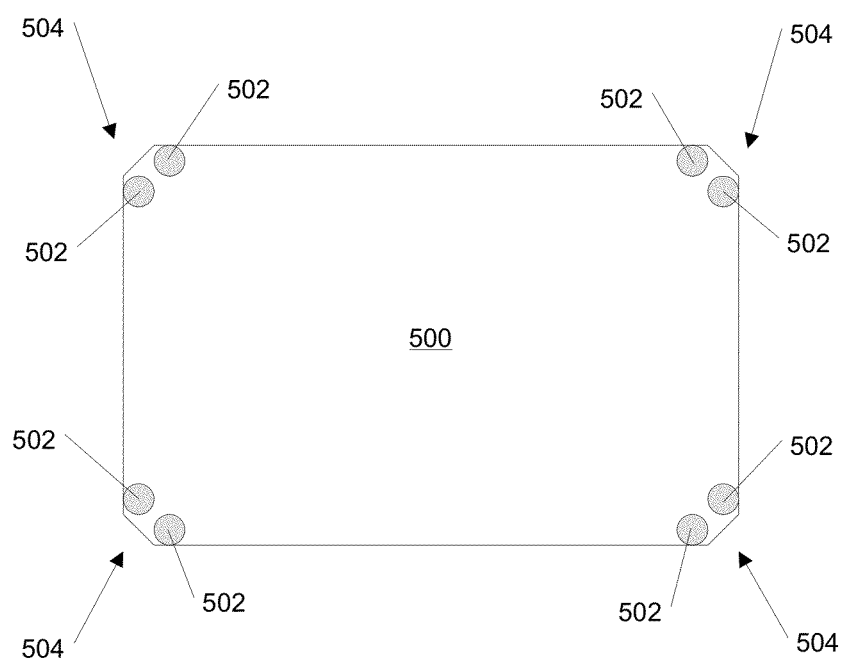
FIG. 5B is a cross-sectional representation of an exemplary embodiment of a reinforced object of the invention when viewed along a plane transverse to a central axis of the object, wherein the object has a rectangular cross-sectional shape.

As illustrated in FIG. 5B, an elongated object with a rectangular cross-sectional shape 500 is reinforced with two reinforcing rods 502 at each of its four corners 504.

EXAMPLE 6

Figure 6:
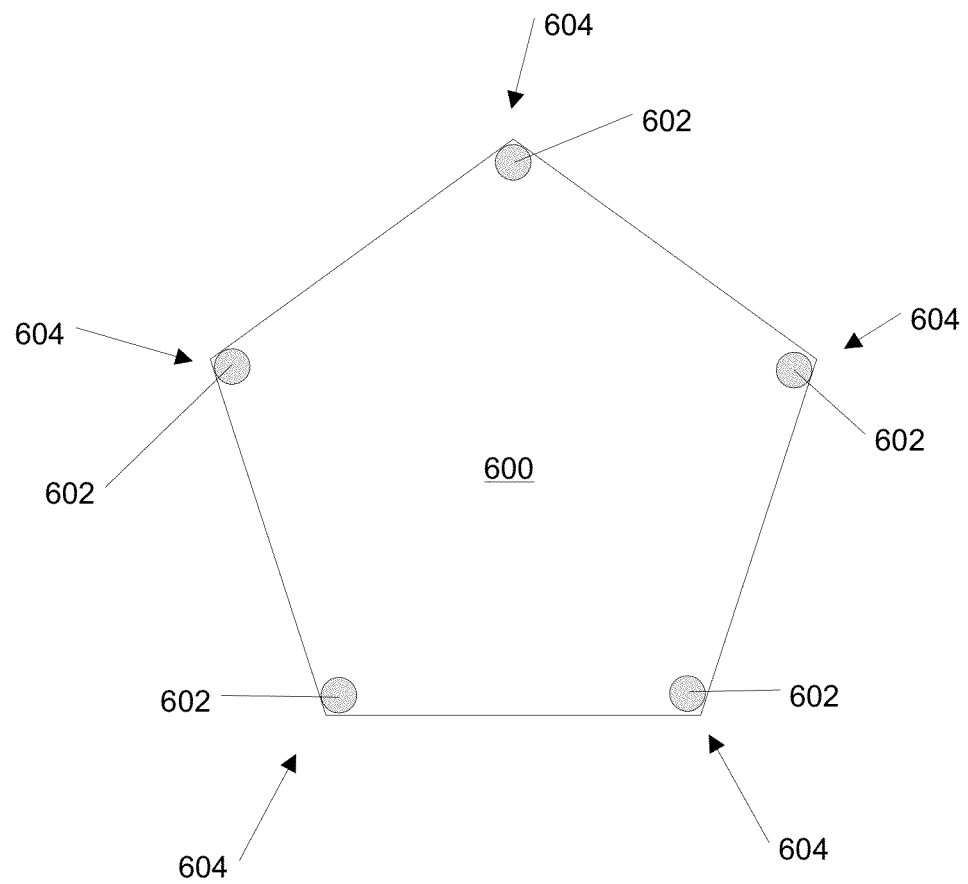
FIG. 6 is a cross-sectional representation of an exemplary embodiment of a reinforced object of the invention when viewed along a plane transverse to a central axis of the object, wherein the object has a pentangular cross-sectional shape.

As illustrated in FIG. 6, an elongated object with a pentangular cross-sectional shape 600 is reinforced with one reinforcing rod 602 at each of its five corners 604.

EXAMPLE 7

Figure 7:
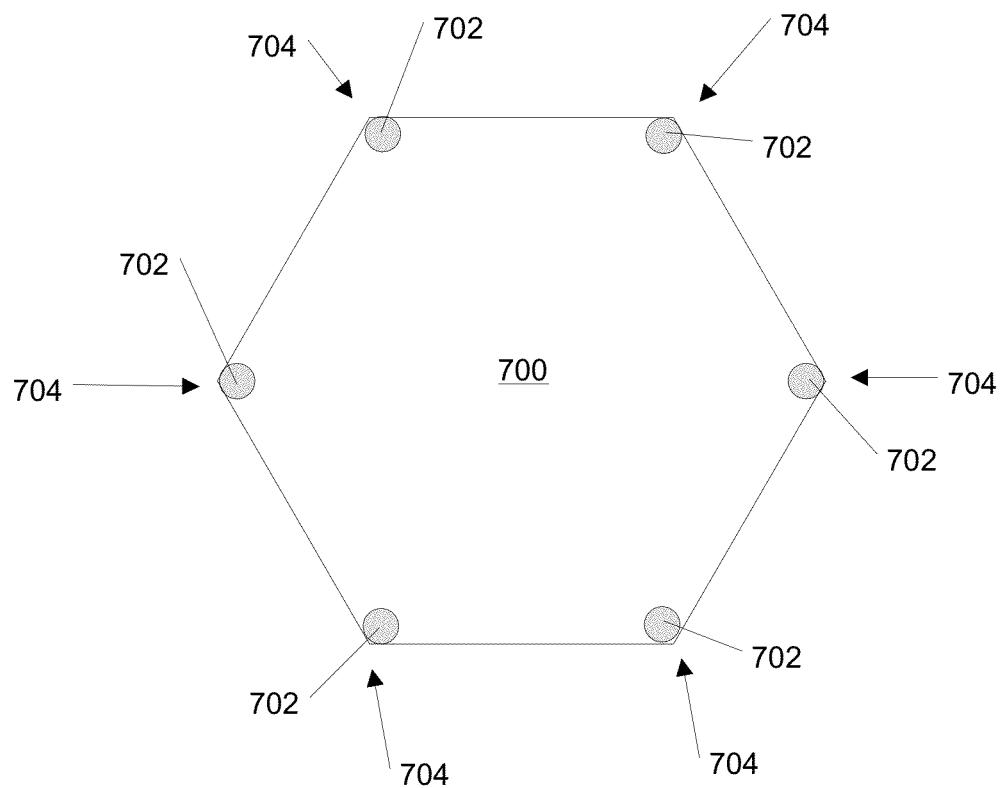
FIG. 7 is a cross-sectional representation of an exemplary embodiment of a reinforced object of the invention when viewed along a plane transverse to a central axis of the object, wherein the object has a hexagonal cross-sectional shape.

As illustrated in FIG. 7, an elongated object with a hexangular cross-sectional shape 700 is reinforced with one reinforcing rod 702 at each of its six corners 704.

EXAMPLE 8

Figure 8:
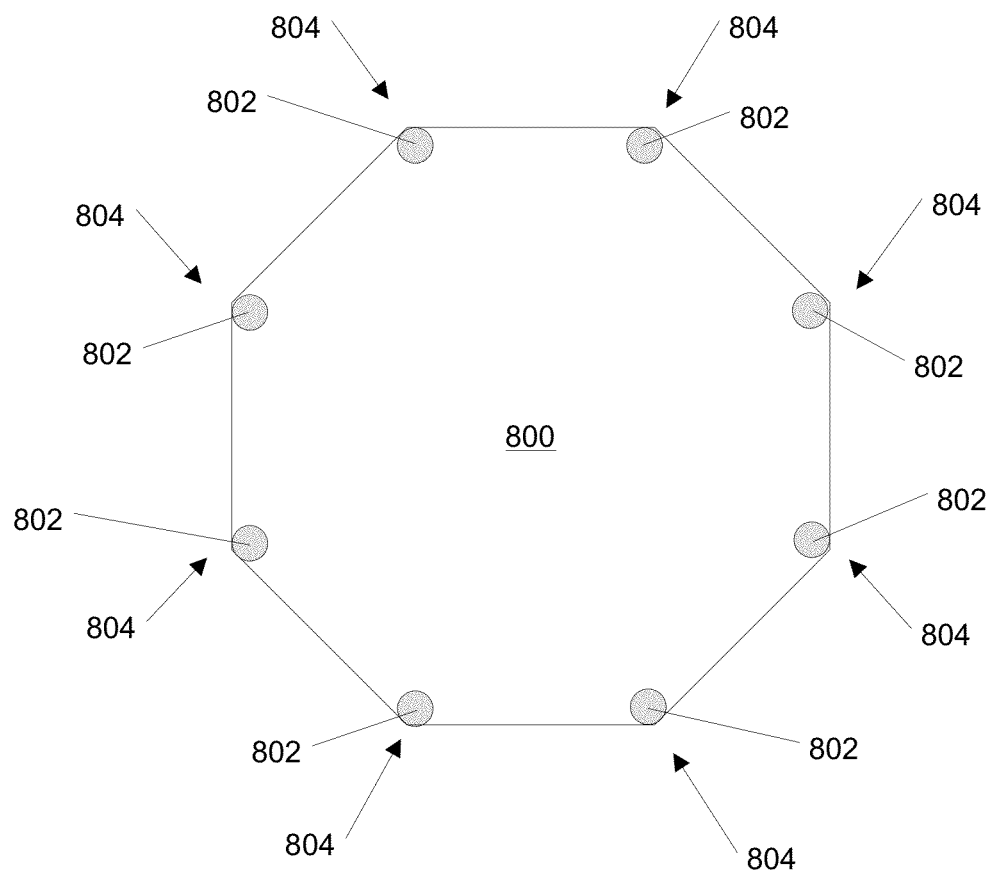
FIG. 8 is a cross-sectional representation of an exemplary embodiment of a reinforced object of the invention when viewed along a plane transverse to a central axis of the object, wherein the object has an octangular cross-sectional shape.

As illustrated in FIG. 8, an elongated object with an octangular cross-sectional shape 800 is reinforced with one reinforcing rod 802 at each of its eight corners 804.

EXAMPLE 9A

Figure 9A:
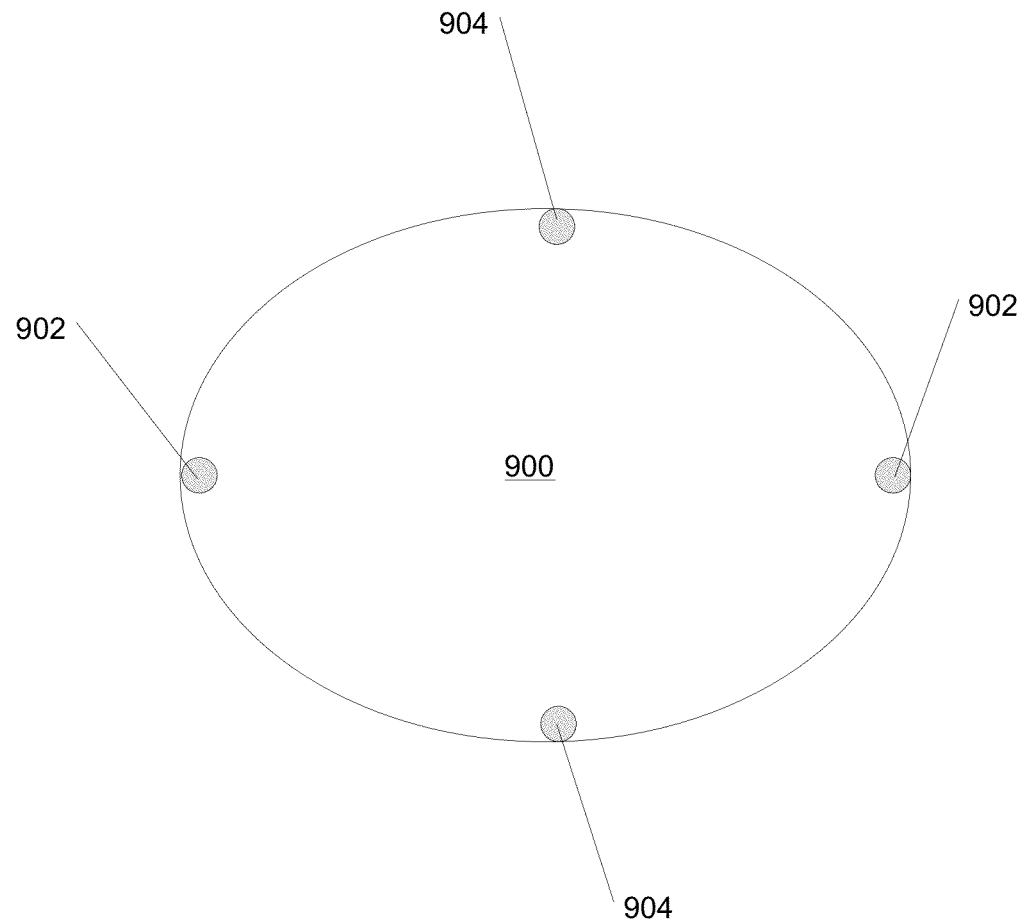
FIG. 9A is a cross-sectional representation of an exemplary embodiment of a reinforced object of the invention when viewed along a plane transverse to a central axis of the object, wherein the object has an elliptical cross-sectional shape.

As illustrated in FIG. 9A, an elongated object with an elliptical cross-sectional shape 900 is reinforced with four reinforcing rods 902, 904 equally spaced around the perimeter of the ellipse. Two reinforcing rods 902 are positioned along the ellipse's semi-major axis proximate the outer surface of the object 900. The other two reinforcing rods 904 are positioned along the ellipse's semi-minor axis proximate the outer surface of the object 900.

EXAMPLE 9B

Figure 9B:
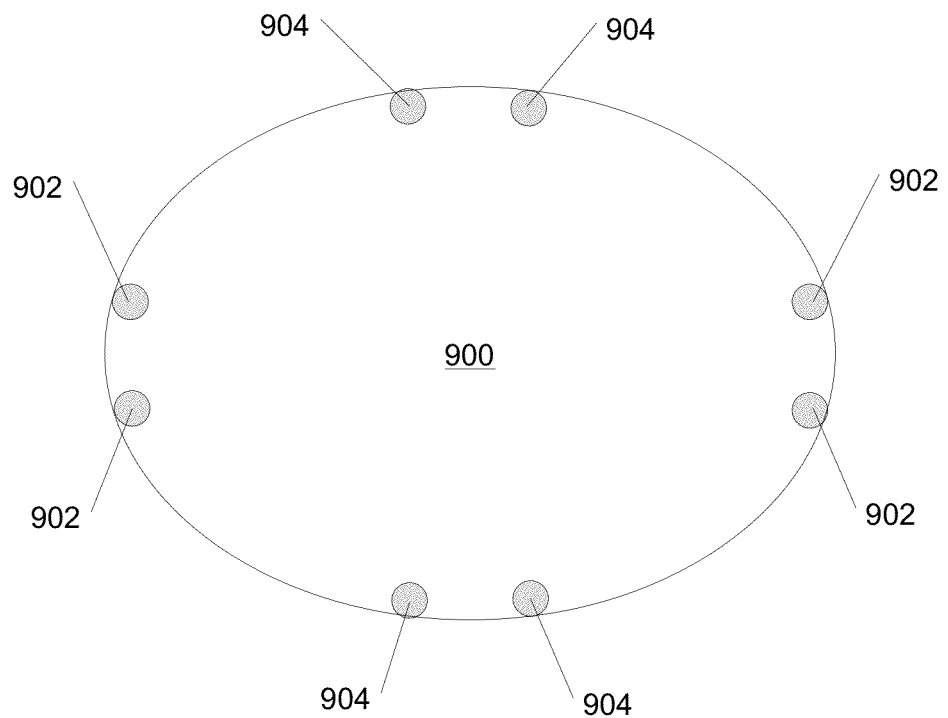
FIG. 9B is a cross-sectional representation of another exemplary embodiment of a reinforced object of the invention when viewed along a plane transverse to a central axis of the object, wherein the object has an elliptical cross-sectional shape.

As illustrated in FIG. 9B, an elongated object with an elliptical cross-sectional shape 900 is reinforced with eight reinforcing rods 902, 904. Two reinforcing rods 902 are positioned adjacent each end of the ellipse's semi-major axis proximate the outer surface of the object 900. Two reinforcing rods 904 are also positioned adjacent each end of the ellipse's semi-minor axis proximate the outer surface of the object 900.

EXAMPLE 10A

Figure 10A:
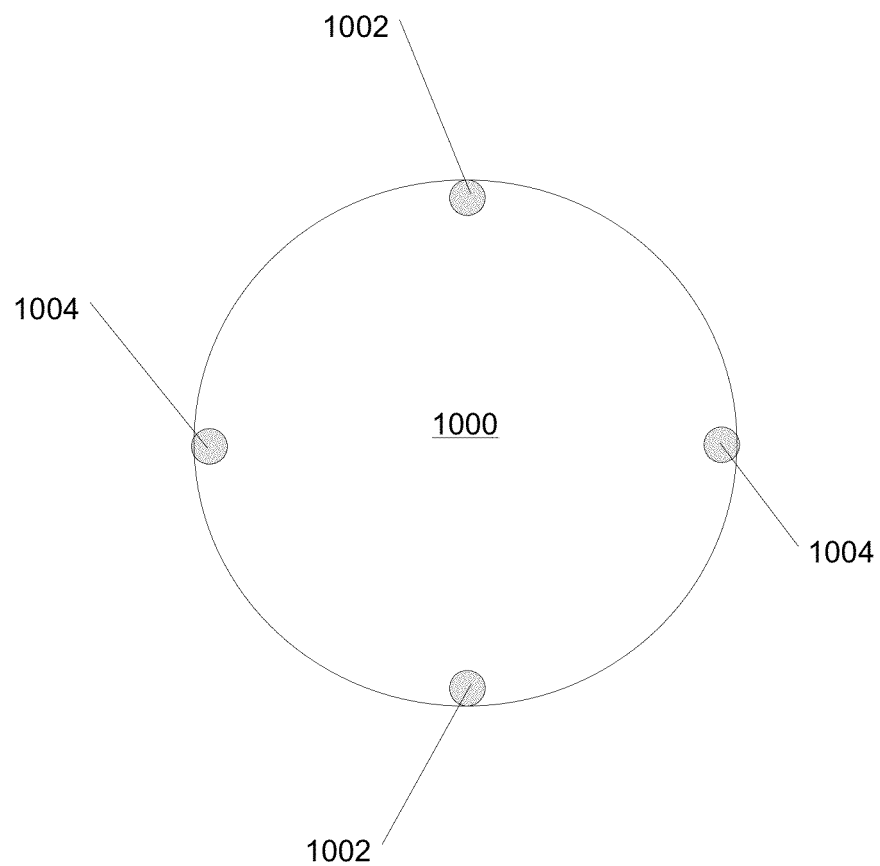
FIG. 10A is a cross-sectional representation of an exemplary embodiment of a reinforced object of the invention when viewed along a plane transverse to a central axis of the object, wherein the object has a circular cross-sectional shape.

As illustrated in FIG. 10A, an elongated object with a circular cross-sectional shape 1000 is reinforced with four reinforcing rods 1002 equally spaced around the perimeter of the circle.

EXAMPLE 10B

Figure 10B:
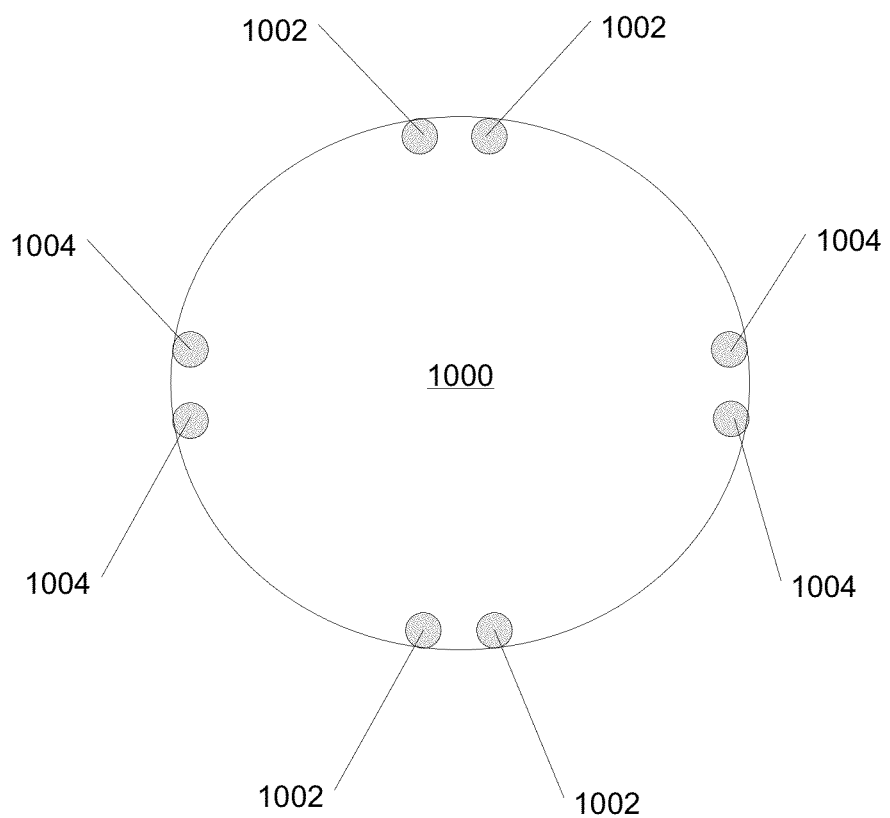
FIG. 10B is a cross-sectional representation of another exemplary embodiment of a reinforced object of the invention when viewed along a plane transverse to a central axis of the object, wherein the object has a circular cross-sectional shape.

As illustrated in FIG. 10B, an elongated object with a circular cross-sectional shape 1000 is reinforced with eight reinforcing rods 1002, 1004. Two reinforcing rods 1002 are positioned adjacent each end of a first diameter of the circle and proximate the outer surface of the object 1000. Two reinforcing rods 1004 are also positioned adjacent each end of a second diameter of the circle, which is orthogonal to the first diameter of the circle and proximate the outer surface of the object 1000.

EXAMPLE 11A

Figure 11A:
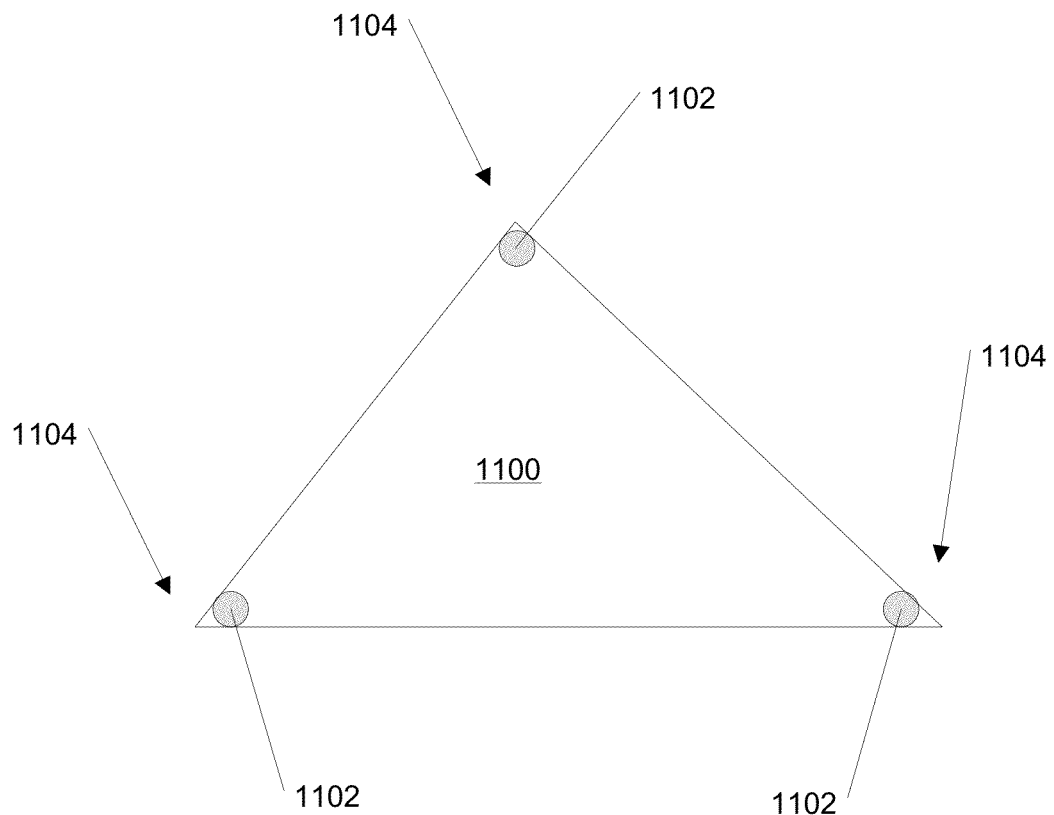
FIG. 11A is a cross-sectional representation of an exemplary embodiment of a reinforced object of the invention when viewed along a plane transverse to a central axis of the object, wherein the object has a triangular cross-sectional shape.

As illustrated in FIG. 11A, an elongated object with a triangular cross-sectional shape 1100 is reinforced with one reinforcing rod 1102 at each of its three corners 1104.

EXAMPLE 11B

Figure 11B:
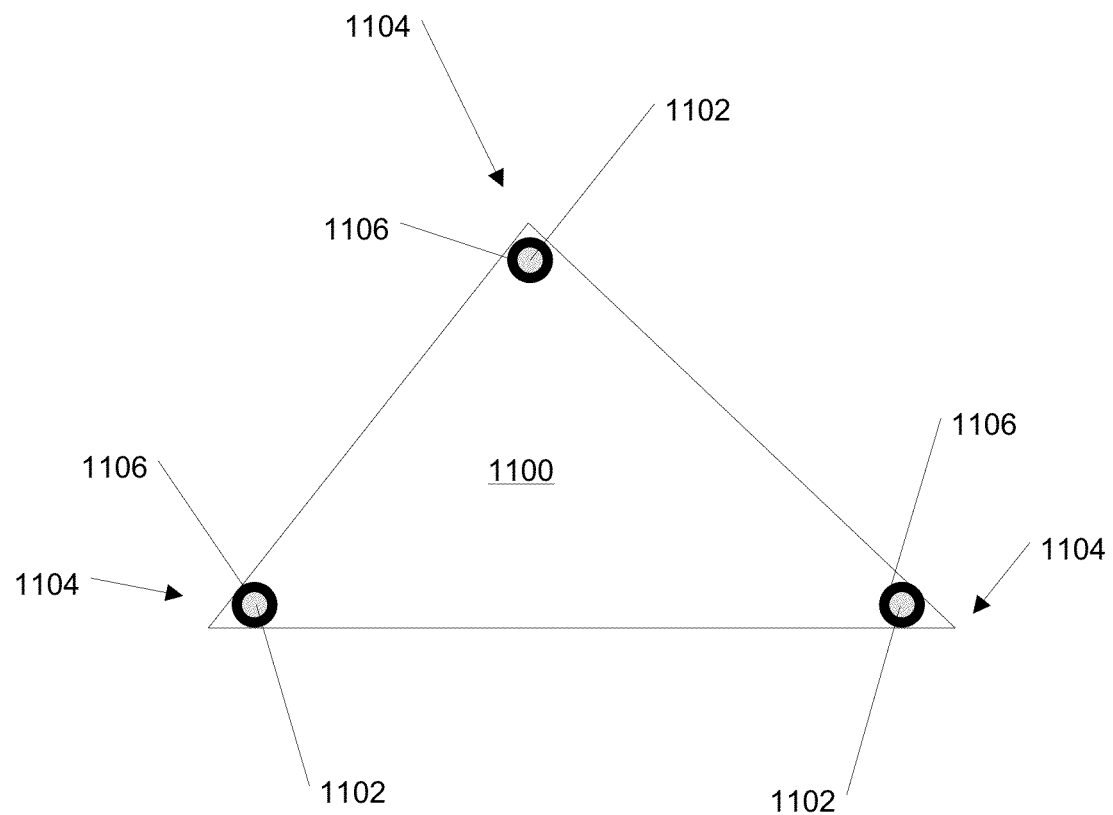
FIG. 11B is a cross-sectional representation of another exemplary embodiment of a reinforced object of the invention when viewed along a plane transverse to a central axis of the object, wherein the object has a triangular cross-sectional shape.

As illustrated in FIG. 11B, an elongated object with a triangular cross-sectional shape 1100 is reinforced with one reinforcing rod 1102 at each of its three corners 1104. Each reinforcing rod 1102 has an encapsulating layer of elastomeric material 1106 according to this embodiment.

EXAMPLE 11C

Figure 11C:
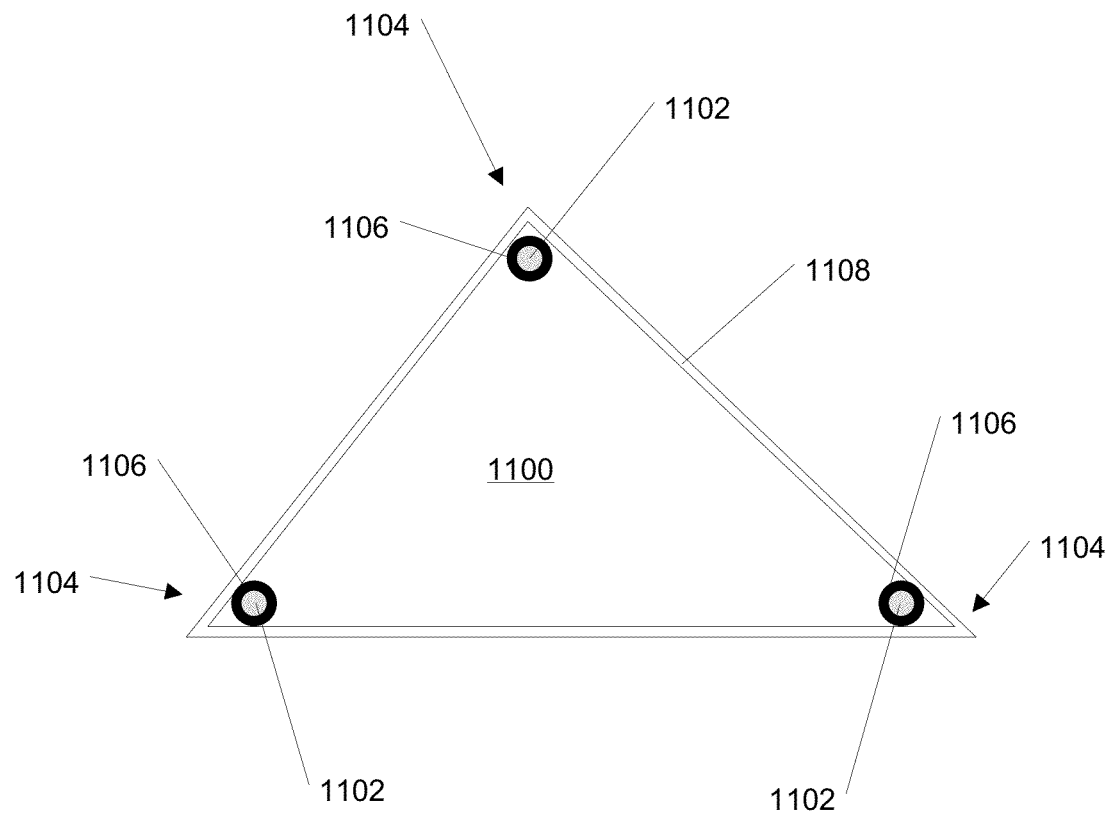
FIG. 11C is a cross-sectional representation of a further embodiment of the reinforced object illustrated in FIG. 1B when viewed along a plane transverse to a central axis of the object.

As illustrated in FIG. 11C, an elongated object with a triangular cross-sectional shape 1100 is reinforced with one reinforcing rod 1102 at each of its three corners 1104. Each reinforcing rod 1102 has an encapsulating layer of elastomeric material 1106 according to this embodiment. Further, to the exterior of the object is affixed a protective/graphic layer 1108.

EXAMPLE 12

Figure 12:
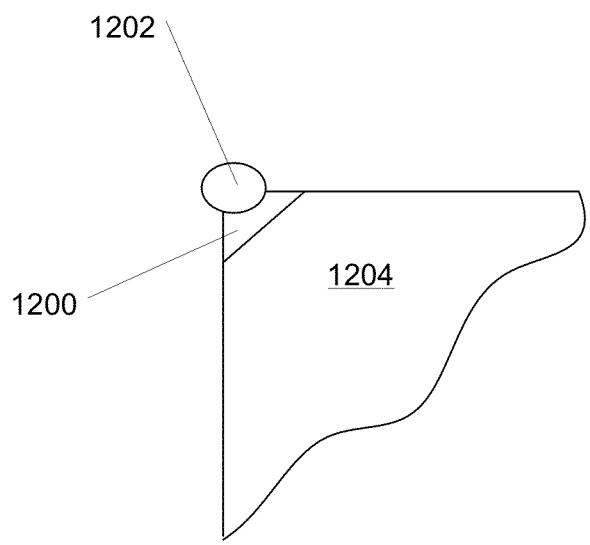
FIG. 12 is a cross-sectional representation of a portion of an exemplary reinforced object when viewed along a plane transverse to a central axis of the object and illustrating a bonding layer disposed between a reinforcing rod and a structural layer thereof.

As illustrated in FIG. 12, a reinforced object, a portion of which is shown, is formed with a bonding layer 1200 disposed between a reinforcing rod 1202 and a structural layer 1204 thereof. The bonding layer 1200 comprises a rigid material in one embodiment. The bonding layer 1200 comprises an elastomeric material in another embodiment.

EXAMPLE 13

Figure 13:
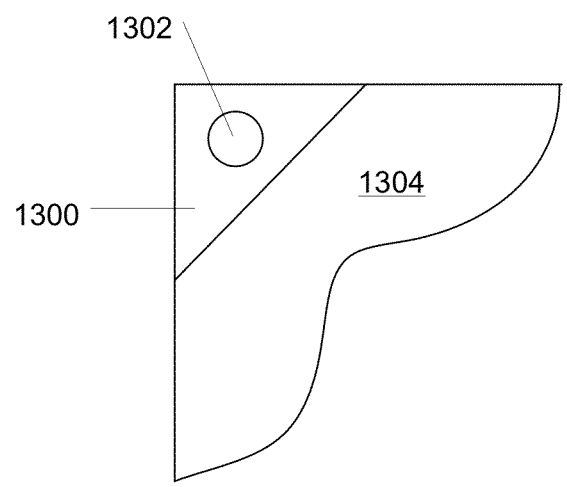
FIG. 13 is a cross-sectional representation of a portion of an exemplary reinforced object when viewed along a plane transverse to a central axis of the object and illustrating an encapsulating layer disposed around a reinforcing rod thereof.

As illustrated in FIG. 13, a reinforced object, a portion of which is shown, is formed with an encapsulating layer 1300 disposed between a reinforcing rod 1302 and a structural layer 1304 thereof. The encapsulating layer 1300 encapsulates the reinforcing rod 1302. The encapsulating layer 1300 comprises a rigid material in one embodiment. The encapsulating layer 1300 comprises an elastomeric material in another embodiment.

EXAMPLE 14A

Figure 14A:
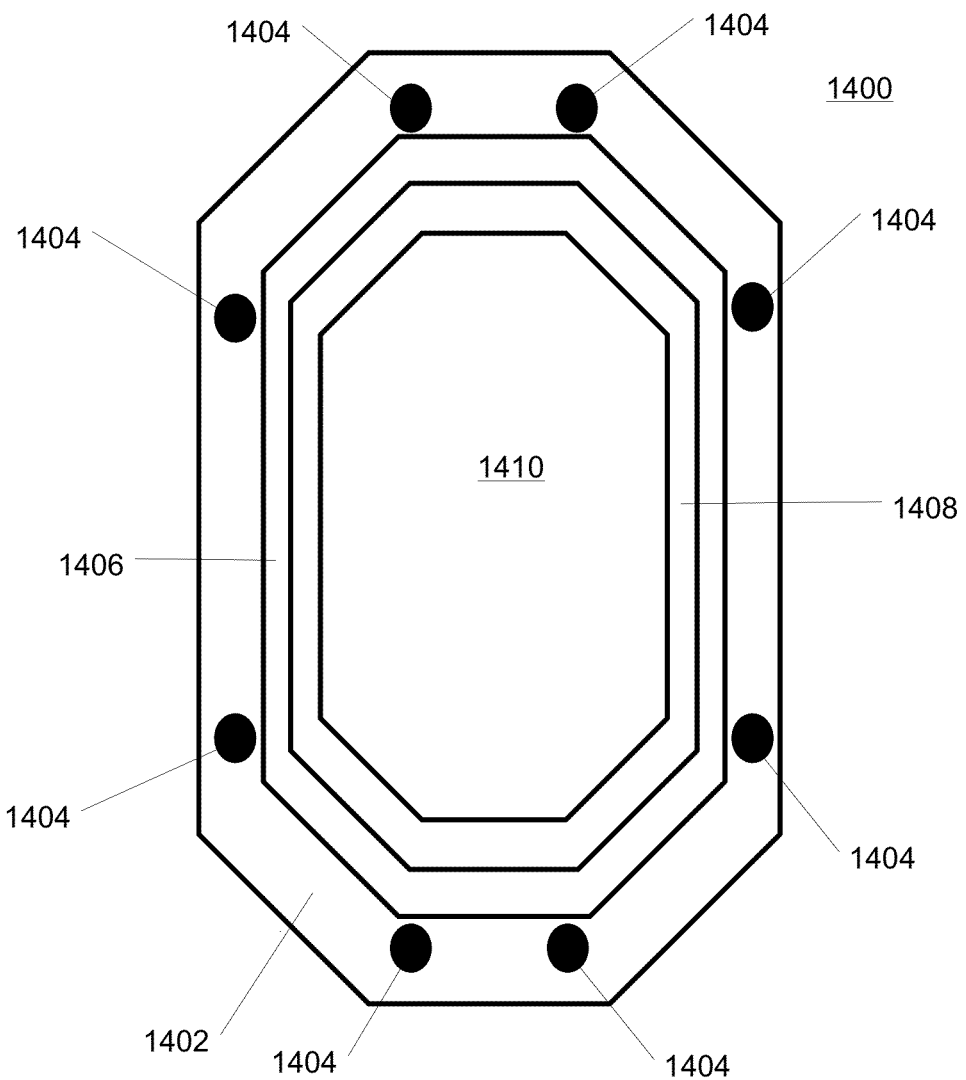
FIG. 14A is a cross-sectional representation of an exemplary reinforced hollow object comprising an outwardly exposed non-structural layer when viewed along a plane transverse to a central axis of the hollow object.

As illustrated in FIG. 14A, a hollow reinforced shaft 1400 is formed with an outwardly exposed non-structural layer 1402. Eight reinforcing rods 1404 are molded within the non-structural layer 1402 so that they are positioned on an outermost structural layer 1406 of the shaft 1400. An interior structural layer 1408 surrounds a hollow interior 1410 of the shaft 1400.

EXAMPLE 14B

Figure 14B:
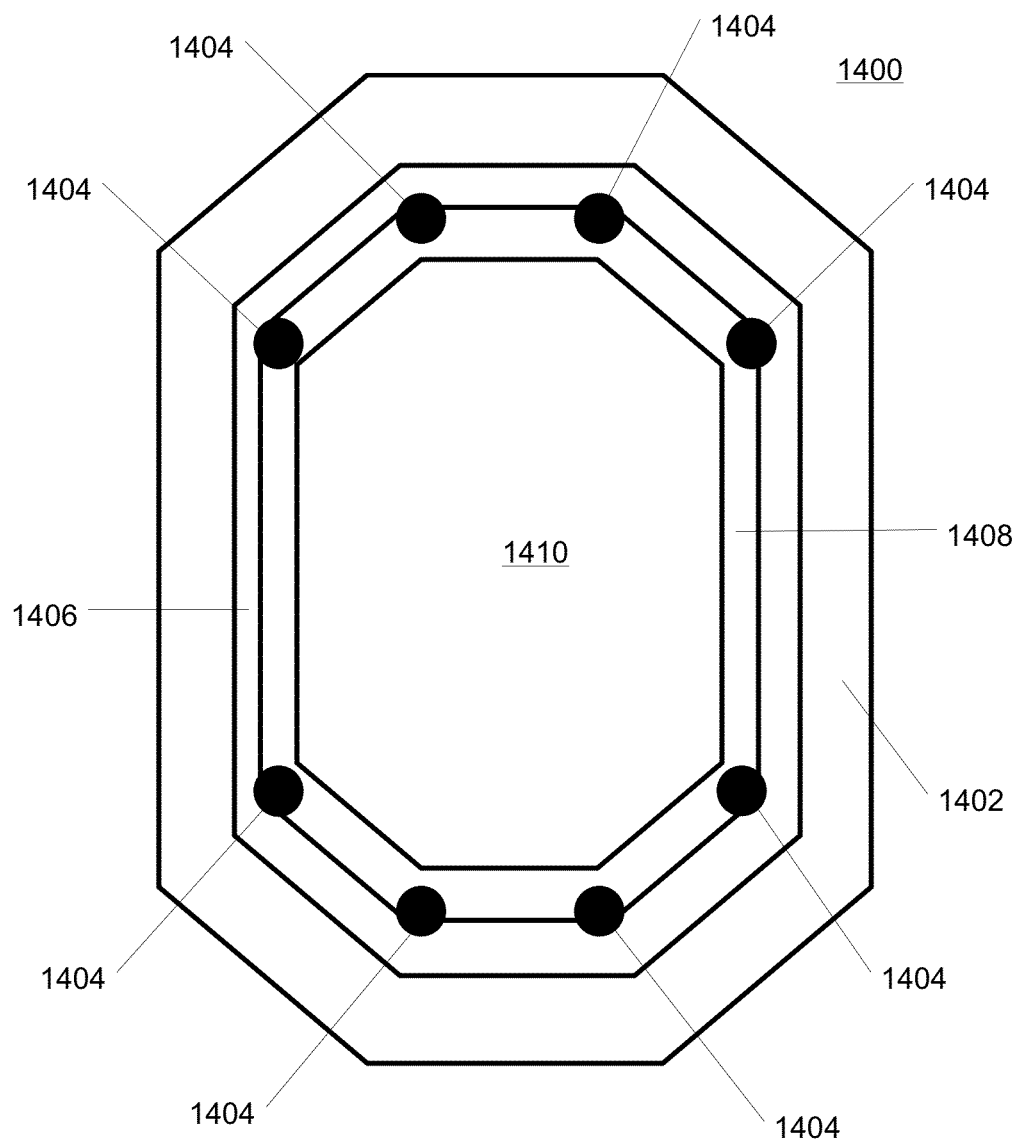
FIG. 14B is a cross-sectional representation of an alternative embodiment of the exemplary reinforced hollow object of FIG. 14A when viewed along a plane transverse to a central axis of the hollow object.

As illustrated in FIG. 14B, an alternative embodiment of a hollow reinforced shaft 1400 is formed with an outwardly exposed non-structural layer 1402. Eight reinforcing rods 1404 are molded between an outermost structural layer 1406 and an interior structural layer 1408 of the shaft 1400. The shaft 1400 has a hollow interior 1410.

EXAMPLE 14C

Figure 14C:
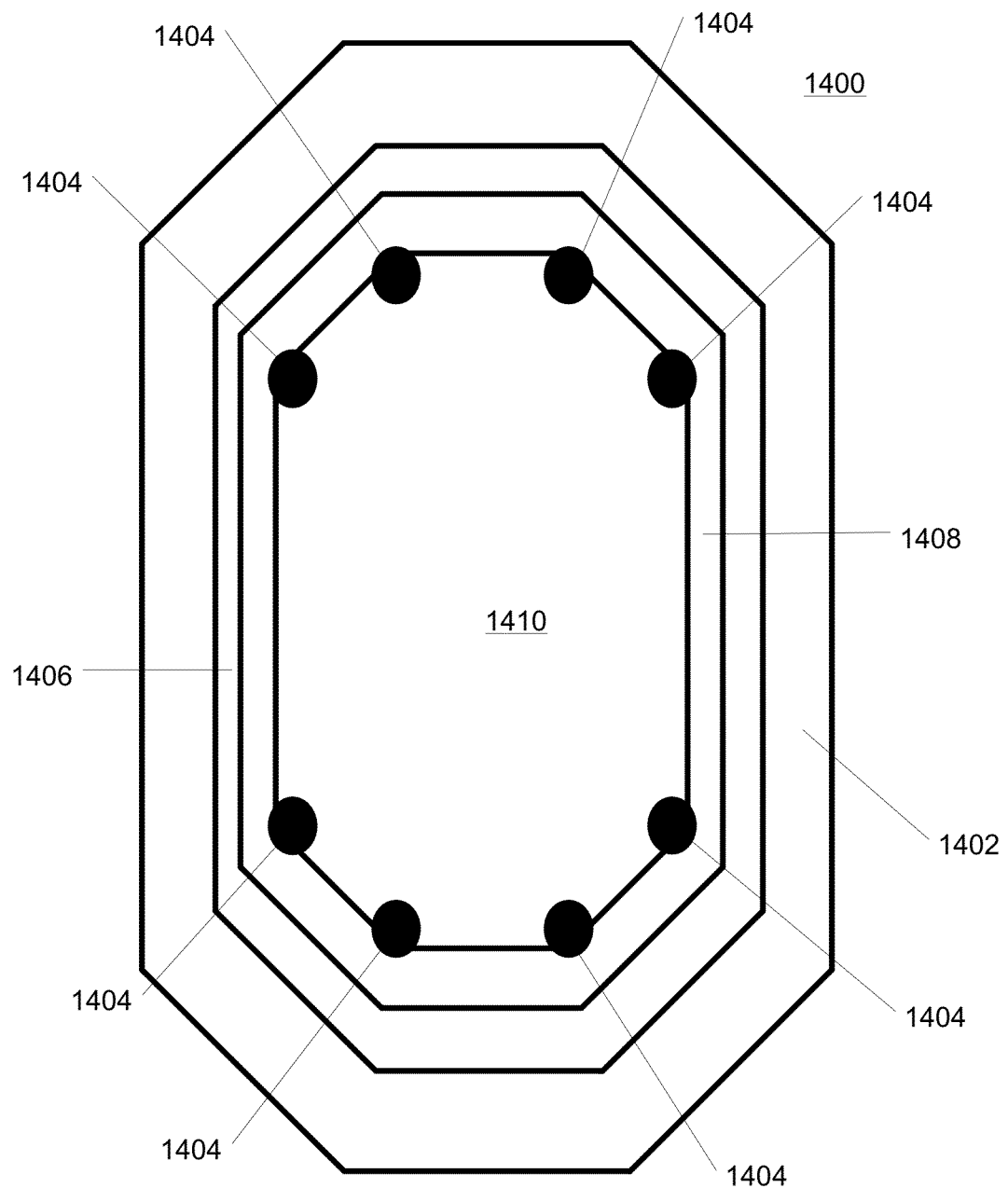
FIG. 14C is a cross-sectional representation of an alternative embodiment of the exemplary reinforced hollow object of FIG. 14A when viewed along a plane transverse to a central axis of the hollow object.

As illustrated in FIG. 14C, an alternative embodiment of a hollow reinforced shaft 1400 is formed with an outwardly exposed non-structural layer 1402. The shaft 1400 comprises an outermost structural layer 1406 and an interior structural layer 1408. Eight reinforcing rods 1404 are positioned on the interior structural layer 1408 adjacent the hollow interior 1410 of the shaft 1400.

EXAMPLE 15A

Figure 15A:
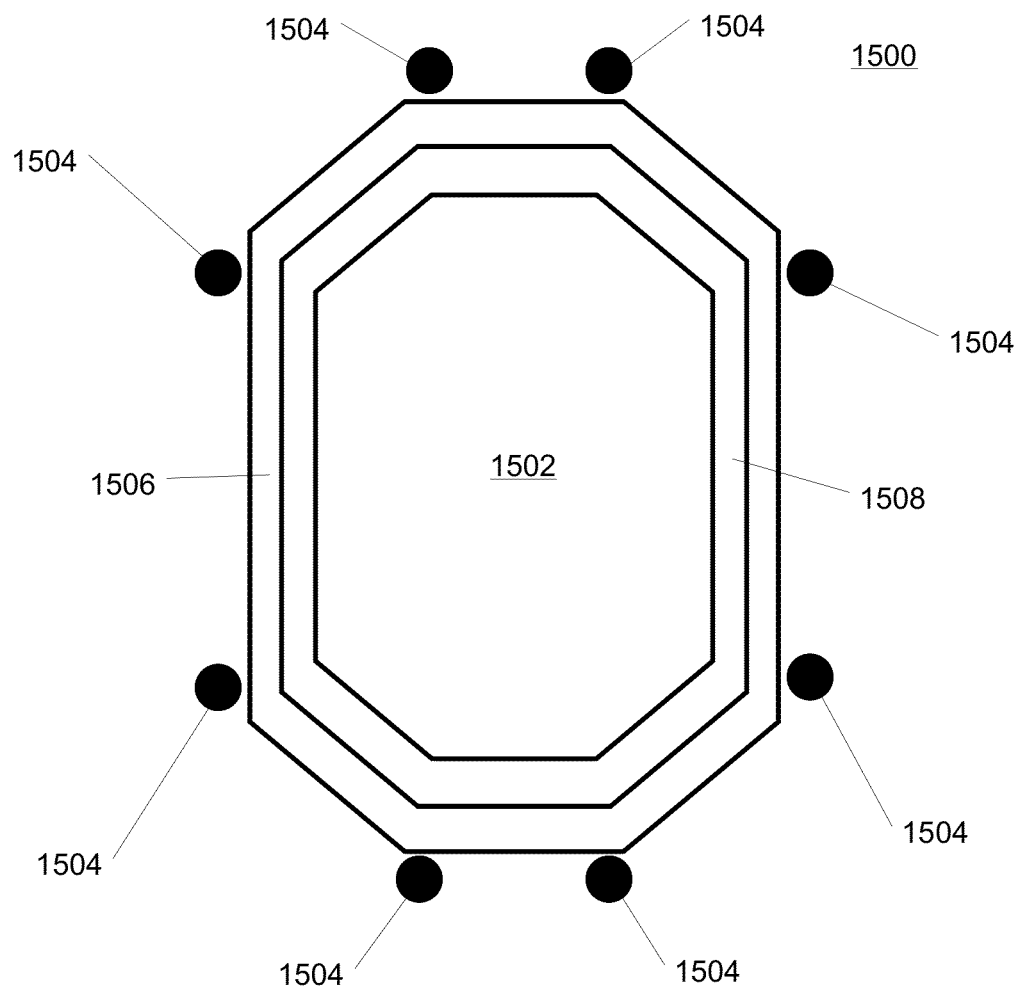
FIG. 15A is a cross-sectional representation of an exemplary reinforced hollow object comprising an outwardly exposed structural layer when viewed along a plane transverse to a central axis of the hollow object.

As illustrated in FIG. 15A, a hollow reinforced shaft 1500 is formed with a hollow interior 1502. The shaft 1500 comprises eight reinforcing rods 1504 positioned on an outwardly exposed surface of an outermost structural layer 1506. An interior structural layer 1508 surrounds the hollow interior 1502 of the shaft 1500. Further layers, such as an outwardly exposed non-structural layer (not shown) may be added to the shaft 1500 so formed.

EXAMPLE 15B

Figure 15B:
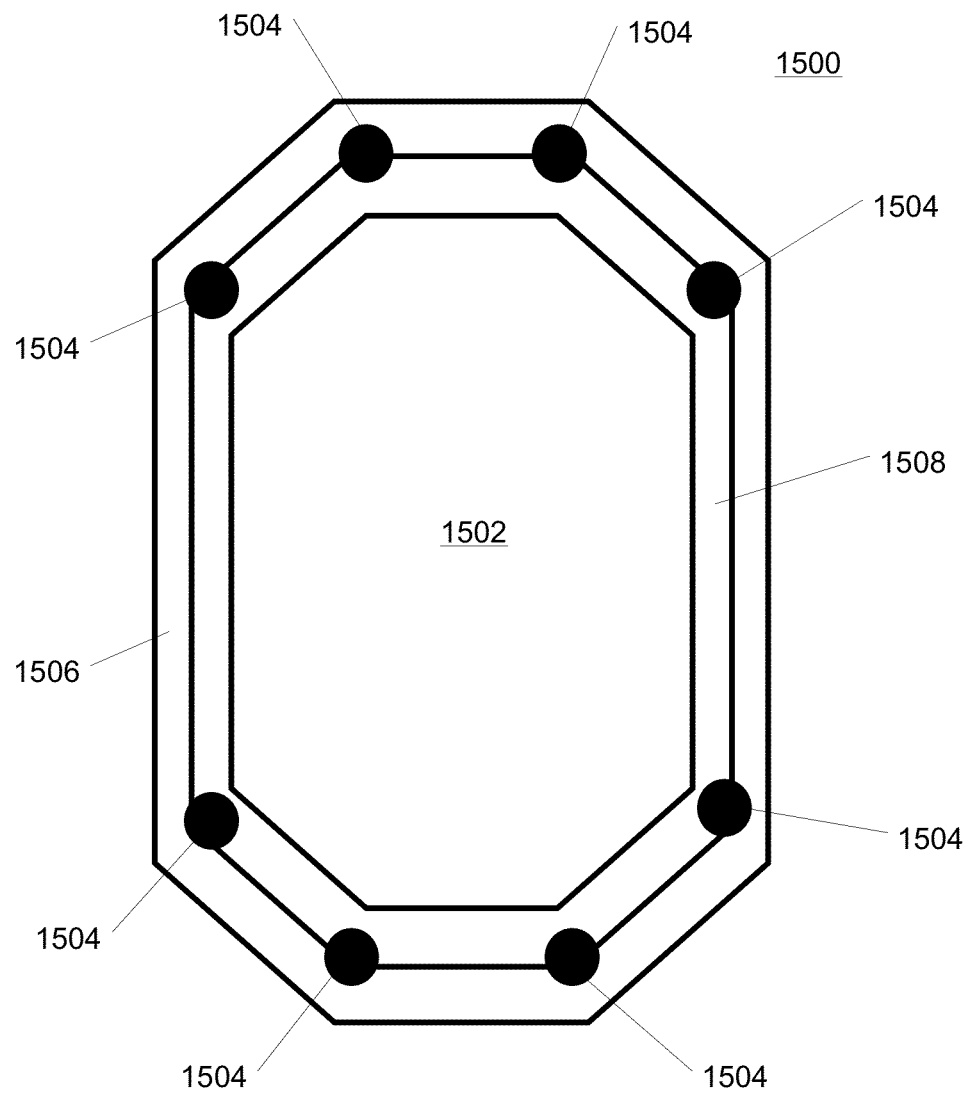
FIG. 15B is a cross-sectional representation of an alternative embodiment of the exemplary reinforced hollow object of FIG. 15A when viewed along a plane transverse to a central axis of the hollow object.

As illustrated in FIG. 15B, a hollow reinforced shaft 1500 is formed with a hollow interior 1502. The shaft 1500 comprises eight reinforcing rods 1504 positioned between an outwardly exposed surface of an outermost structural layer 1506 and an interior structural layer 1508 surrounding the hollow interior 1502 of the shaft 1500. Further layers, such as an outwardly exposed non-structural layer (not shown) may be added to the shaft 1500 so formed.

EXAMPLE 15C

Figure 15C:
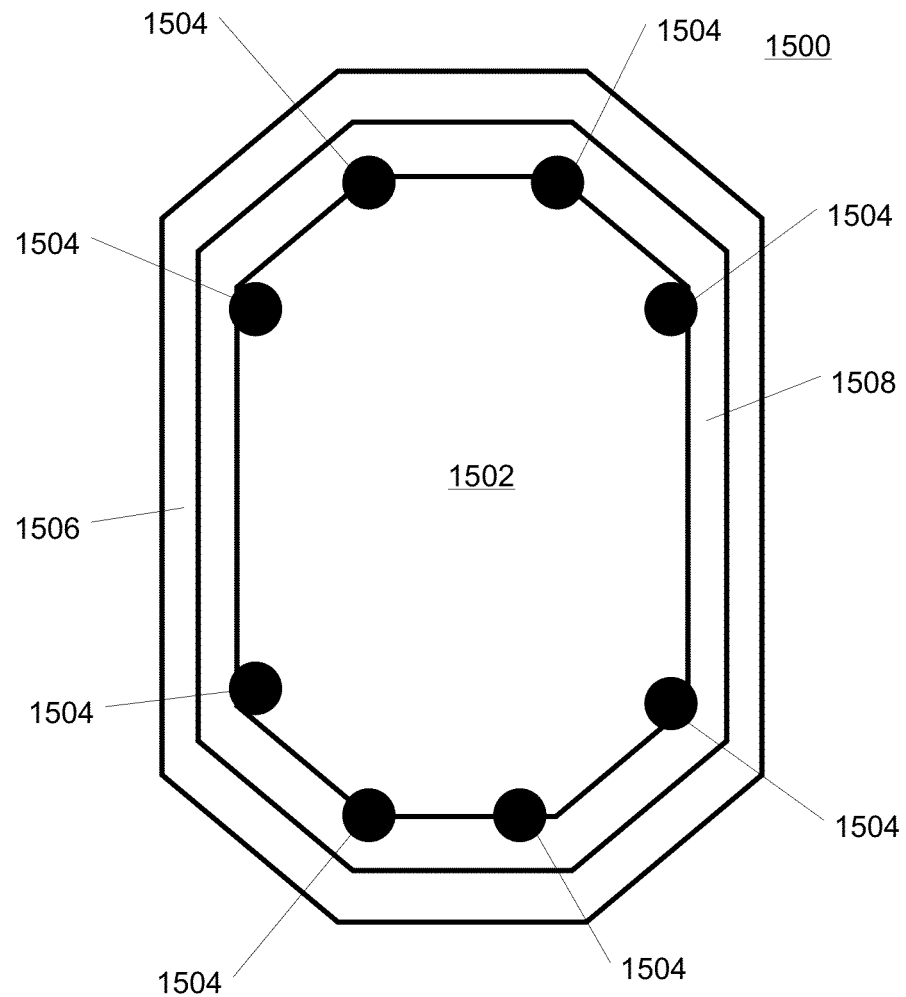
FIG. 15C is a cross-sectional representation of an alternative embodiment of the exemplary reinforced hollow object of FIG. 15A when viewed along a plane transverse to a central axis of the hollow object.

As illustrated in FIG. 15C, a hollow reinforced shaft 1500 is formed with a hollow interior 1502. The shaft 1500 comprises eight reinforcing rods 1504 positioned adjacent the hollow interior 1502 of the shaft. The shaft 1500 comprises an outermost structural layer 1506 and an interior structural layer 1508 on which the reinforcing rods 1504 are positioned. Further layers, such as an outwardly exposed non-structural layer (not shown) may be added to the shaft 1500 so formed.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention.

The invention claimed is:

1. A reinforced object, comprising:
   at least one structural layer comprising a composite material, wherein the at least one structural layer comprises an outermost structural layer of the object; and
   at least two adjacent reinforcing rods positioned on the outermost structural layer of the object adjacent a location on the object that is prone to impact and unequally spaced at locations on the object that are prone to impact, each of the at least two reinforcing rods having a thickness such that it is rigid and comprising a material not contained within the outermost structural layer of the object,
   wherein the object is an elongated object, with the at least two reinforcing rods longitudinally positioned essentially parallel to and never converging with a central axis thereof,
   wherein the at least two reinforcing rods within the object each have a length approximating length of the object,
   wherein the at least two reinforcing rods each have a diameter that is about 0.5 to about 2.0 times maximum wall thickness within the object, and wherein the object comprises a shaft-based sporting implement.

2. The reinforced object of claim 1, wherein the object comprises a lacrosse stick.

3. The reinforced object of claim 1, wherein the object comprises a hockey stick.

4. The reinforced object of claim 1, wherein at least one of the object and the at least two reinforcing rods has a cross-sectional shape, with respect to a section taken transverse to the central axis, selected from the following shapes: circle, ellipse, triangle, square, rectangle, pentagon, hexagon, and octagon.

5. The reinforced object of claim 1, wherein the object is hollow.

6. The reinforced object of claim 1, wherein the object is solid.

7. The reinforced object of claim 1, wherein the at least one structural layer comprises a fiber-reinforced composite material.

8. The reinforced object of claim 1, wherein the at least one structural layer comprises a carbon fiber-reinforced composite material.

9. The reinforced object of claim 1, wherein each of the at least two reinforcing rods within the object is discrete.

10. The reinforced object of claim 1, wherein the at least two reinforcing rods comprise carbon.

11. The reinforced object of claim 1, wherein each of the at least two reinforcing rods is at least partially encapsulated within a layer of elastomeric material.

12. The reinforced object of claim 1, wherein each of the at least two reinforcing rods is at least partially encapsulated within a layer of rigid material.

13. The reinforced object of claim 1, further comprising a bonding layer comprising a rigid material disposed between each of the at least two reinforcing rods and the at least one structural layer.

14. The reinforced object of claim 1, further comprising a bonding layer comprising an elastomeric material disposed between each of the at least two reinforcing rods and the at least one structural layer.

15. The reinforced object of claim 1, wherein each of the at least two reinforcing rods is positioned at a corner of the object.

16. The reinforced object of claim 1, wherein the object comprises at least six reinforcing rods.

17. The reinforced object of claim 1, wherein the object comprises at least eight reinforcing rods.

18. The reinforced object of claim 1, wherein each of the at least two reinforcing rods has a circular cross-sectional shape, with respect to a section taken transverse to the central axis.

19. The reinforced object of claim 1, wherein each of the at least two reinforcing rods has an elliptical cross-sectional shape, with respect to a section taken transverse to the central axis.

20. The reinforced object of claim 1, wherein each of the at least two reinforcing rods has a thickness of greater than 1.0 millimeters (0.04 inch).

21. The reinforced object of claim 1, wherein each of the at least two reinforcing rods is solid.

22. A method of manufacturing the reinforced object of claim 1, the method comprising steps of:
   providing a mold; and
   positioning the at least two reinforcing rods such that they are positioned on the at least one structural layer in the reinforced object formed in the mold.

* * * * *

UNITED STATES PATENT AND TRADEMARK OFFICE
CERTIFICATE OF CORRECTION

| | | |
|---|---|---|
| PATENT NO. | : 8,747,261 B2 | Page 1 of 1 |
| APPLICATION NO. | : 12/624370 | |
| DATED | : June 10, 2014 | |
| INVENTOR(S) | : James E. McGuire, Jr. et al. | |

It is certified that error appears in the above-identified patent and that said Letters Patent is hereby corrected as shown below:

On the title page, under abstract, "22 Claims, 27 Drawing Sheets" should read
-- 24 Claims, 27 Drawing Sheets --

In the Claims:

Add the following Claims:

-- 23. The reinforced object of claim 1, wherein the object comprises at least four reinforcing rods. --

-- 24. The reinforced object of claim 1, wherein length of each of the at least two reinforcing rods within the object approximates length of the object. --

Signed and Sealed this
Twelfth Day of August, 2014

Michelle K. Lee
*Deputy Director of the United States Patent and Trademark Office*